US012573386B2

(12) United States Patent
Makay

(10) Patent No.: US 12,573,386 B2
(45) Date of Patent: Mar. 10, 2026

(54) APPARATUSES, SYSTEMS, AND METHODS FOR SPEECH RECOGNITION BY SPEECH RATE AND HINT-BASED TECHNIQUES

(71) Applicant: Vocollect, Inc., Pittsburgh, PA (US)

(72) Inventor: Jason Makay, North Huntingdon, PA (US)

(73) Assignee: Vocollect, Inc., Pittsburgh, PA (US)

( * ) Notice: Subject to any disclaimer, the term of this patent is extended or adjusted under 35 U.S.C. 154(b) by 878 days.

(21) Appl. No.: 17/657,485

(22) Filed: Mar. 31, 2022

(65) Prior Publication Data

US 2023/0317070 A1 Oct. 5, 2023

(51) Int. Cl.

*G10L 15/22* (2006.01)
*G10L 15/00* (2013.01)
*G10L 15/02* (2006.01)
*G10L 15/04* (2013.01)
*G10L 15/06* (2013.01)

(52) U.S. Cl.

CPC ............ *G10L 15/22* (2013.01); *G10L 15/005* (2013.01); *G10L 15/02* (2013.01); *G10L 15/04* (2013.01); *G10L 15/063* (2013.01)

(58) Field of Classification Search

CPC ....... G10L 15/22; G10L 15/005; G10L 15/02; G10L 15/04; G10L 15/063; G10L 2015/228; G10L 25/48; G10L 21/04; G10L 15/06; G10L 15/05; G10L 15/08; G10L 15/16; G10L 15/183; G10L 15/26; G10L 2015/223; G06F 3/167; G06F 40/279; G06F 3/16; G06F 3/162; G06F 3/165

See application file for complete search history.

(56) References Cited

U.S. PATENT DOCUMENTS 4,506,377 A * 3/1985 Kishi ...................... G10L 15/22
704/E15.04
4,506,378 A * 3/1985 Noso .................. B60R 16/0373
704/251
4,528,687 A * 7/1985 Noso .................. B60R 16/0373
704/E15.04
4,532,648 A * 7/1985 Noso ....................... G10L 25/87
704/E11.005
5,054,085 A * 10/1991 Meisel .................... G10L 15/07
704/207
5,689,616 A * 11/1997 Li ......................... G10L 15/005
704/243

(Continued)

OTHER PUBLICATIONS

Yuan J, Liberman M. Robust speaking rate estimation using broad phonetic class recognition. In 2010 IEEE International Conference on Acoustics, Speech and Signal Processing Mar. 14, 2010 (pp. 4222-4225). IEEE. (Year: 2010).*

(Continued)

*Primary Examiner* — Thuykhanh Le
(74) *Attorney, Agent, or Firm* — Alston & Bird LLP

(57) ABSTRACT

The present application provides methods, apparatuses, and/or the like that are configured to accurately and efficiently train a speech recognition speech rate model to generate an optimized digital signal from speech input of a user for decoding. For example, the decoding includes accessing a hint data object at or around the time of the speech input to determine an output hypothesis from a plurality of hypotheses that matches the speech input.

20 Claims, 8 Drawing Sheets

(56) References Cited

U.S. PATENT DOCUMENTS

| | | | | |
|---|---|---|---|---|
| 5,729,694 | A * | 3/1998 | Holzrichter | G06Q 20/204 704/E15.041 |
| 5,828,994 | A * | 10/1998 | Covell | G10L 21/04 704/211 |
| 5,909,482 | A * | 6/1999 | Engelke | H04M 11/066 704/E15.045 |
| 6,009,386 | A * | 12/1999 | Cruickshank | G10L 21/04 704/211 |
| 6,055,498 | A * | 4/2000 | Neumeyer | G09B 19/04 704/E15.005 |
| 6,304,844 | B1 * | 10/2001 | Pan | G10L 15/187 704/E15.02 |
| 6,629,072 | B1 * | 9/2003 | Thelen | G10L 15/07 704/251 |
| 6,922,669 | B2 * | 7/2005 | Schalk | G10L 15/18 704/251 |
| 7,219,057 | B2 * | 5/2007 | Yang | G10L 15/30 704/E15.047 |
| 8,140,327 | B2 * | 3/2012 | Kennewick | G10L 15/1822 704/226 |
| 8,781,825 | B2 * | 7/2014 | Shaw | G10L 15/10 704/235 |
| 9,171,551 | B2 * | 10/2015 | Tzirkel-Hancock | G10L 21/0208 |
| 9,558,762 | B1 * | 1/2017 | Sieracki | G10L 15/00 |
| 9,818,427 | B2 * | 11/2017 | Cahill | G10L 25/78 |
| 9,886,945 | B1 * | 2/2018 | Sieracki | G10L 15/08 |
| 9,984,685 | B2 * | 5/2018 | Braho | G10L 15/22 |
| 10,199,034 | B2 * | 2/2019 | Conkie | G10L 13/08 |
| 10,269,342 | B2 | 4/2019 | Braho et al. | |
| 10,276,185 | B1 * | 4/2019 | Ma | G10L 25/78 |
| 10,332,508 | B1 * | 6/2019 | Hoffmeister | G06N 3/08 |
| 10,652,655 | B1 * | 5/2020 | Weldemariam | H04R 27/00 |
| 11,295,069 | B2 * | 4/2022 | Helmbro | G10L 25/78 |
| 11,468,884 | B2 * | 10/2022 | Sawata | G10L 15/20 |
| 2001/0004396 | A1 * | 6/2001 | Engelke | H04M 11/10 704/E15.045 |
| 2001/0005411 | A1 * | 6/2001 | Engelke | H04M 11/066 704/271 |
| 2002/0133334 | A1 * | 9/2002 | Coorman | G10L 21/04 704/211 |
| 2003/0078777 | A1 * | 4/2003 | Shiau | G10L 15/30 704/E15.047 |
| 2006/0149535 | A1 * | 7/2006 | Choi | G10L 21/04 704/207 |
| 2007/0073539 | A1 * | 3/2007 | Chengalvarayan | G10L 15/20 704/E15.039 |
| 2007/0192101 | A1 * | 8/2007 | Braho | G10L 15/065 704/E15.009 |
| 2008/0101556 | A1 * | 5/2008 | Kim | G10L 15/01 379/88.04 |
| 2008/0109224 | A1 * | 5/2008 | Dvorak | G10L 25/69 704/E15.001 |
| 2009/0150151 | A1 * | 6/2009 | Sakuraba | G10L 21/04 704/E17.001 |
| 2011/0035215 | A1 * | 2/2011 | Sompolinsky | G10L 15/04 704/E15.001 |
| 2012/0116186 | A1 * | 5/2012 | Shrivastav | G10L 25/48 600/301 |
| 2012/0185247 | A1 * | 7/2012 | Tzirkel-Hancock | H04R 3/005 381/92 |
| 2013/0266128 | A1 * | 10/2013 | Blanchard | H04M 3/36 379/88.01 |
| 2015/0170644 | A1 * | 6/2015 | Franco | G10L 25/48 704/254 |
| 2015/0348536 | A1 * | 12/2015 | Ando | G10L 15/01 704/234 |
| 2016/0358598 | A1 * | 12/2016 | Williams | G10L 17/02 |
| 2017/0011745 | A1 * | 1/2017 | Navaratnam | H04N 7/157 |
| 2017/0092262 | A1 * | 3/2017 | Pinhasi | G10L 15/02 |
| 2017/0365257 | A1 * | 12/2017 | Lin | G10L 19/00 |
| 2018/0166071 | A1 * | 6/2018 | Lee | G10L 15/07 |
| 2018/0247642 | A1 * | 8/2018 | Kim | G10L 15/04 |
| 2019/0156826 | A1 * | 5/2019 | Cromack | G06F 16/287 |
| 2019/0310823 | A1 * | 10/2019 | Chang | G06F 40/40 |
| 2020/0193977 | A1 * | 6/2020 | Ramabhadran | G06N 3/09 |
| 2020/0302913 | A1 * | 9/2020 | Marcinkiewicz | G10L 15/02 |
| 2020/0402513 | A1 * | 12/2020 | Zhu | H04M 1/72412 |
| 2021/0035598 | A1 * | 2/2021 | Chiang | G10L 25/51 |
| 2021/0065582 | A1 * | 3/2021 | Liao | G10L 15/02 |
| 2022/0059071 | A1 * | 2/2022 | Pearce | H04N 21/4788 |
| 2022/0059117 | A1 * | 2/2022 | Shor | G06N 5/046 |
| 2022/0230645 | A1 * | 7/2022 | Xu | G10L 19/24 |
| 2022/0343898 | A1 * | 10/2022 | Fu | G10L 15/063 |
| 2022/0383887 | A1 * | 12/2022 | Wang | G10L 25/51 |
| 2023/0307148 | A1 * | 9/2023 | Meyerson | G10L 25/57 |

OTHER PUBLICATIONS

Shahnawazuddin S, Adiga N, Kathania HK, Pradhan G, Sinha R. Studying the role of pitch-adaptive spectral estimation and speaking-rate normalization in automatic speech recognition. Digital Signal Processing. Aug. 1, 2018;79:142-51. (Year: 2018).*

Pellegrino F, Farinas J, Rouas JL. Automatic estimation of speaking rate in multilingual spontaneous speech. In Speech Prosody 2004, International Conference 2004. (Year: 2004).*

Stemmer G, Hacker C, Steidl S, Noth E. Acoustic normalization of children's speech. In INTERSPEECH Sep. 2003 (pp. 1313-1316). (Year: 2003).*

* cited by examiner

400

RECEIVE A SPEECH INPUT FROM A USER, THE SPEECH INPUT COMPRISING AN ELECTRICAL SIGNAL — 410

CONVERT THE ELECTRICAL SIGNAL TO DIGITAL DATA, THE DIGITAL DATA COMPRISING A SPEECH RATE DATA — 420

PROCESS THE DIGITAL DATA BY A SPEECH RECOGNITION SPEECH RATE MODEL TRAINED TO DETERMINE AN OPTIMIZED SPEECH RATE OF THE DIGITAL DATA, WHEREIN THE OPTIMIZED SPEECH RATE IS BASED ON THE SPEECH RATE DATA AT A PREDETERMINED RANGE — 430

APPLY THE OPTIMIZED SPEECH RATE TO THE DIGITAL DATA TO GENERATE AN OPTIMIZED DIGITAL SIGNAL — 440

PROCESS THE OPTIMIZED DIGITAL SIGNAL BY A SPEECH RECOGNITION DECODER — 450

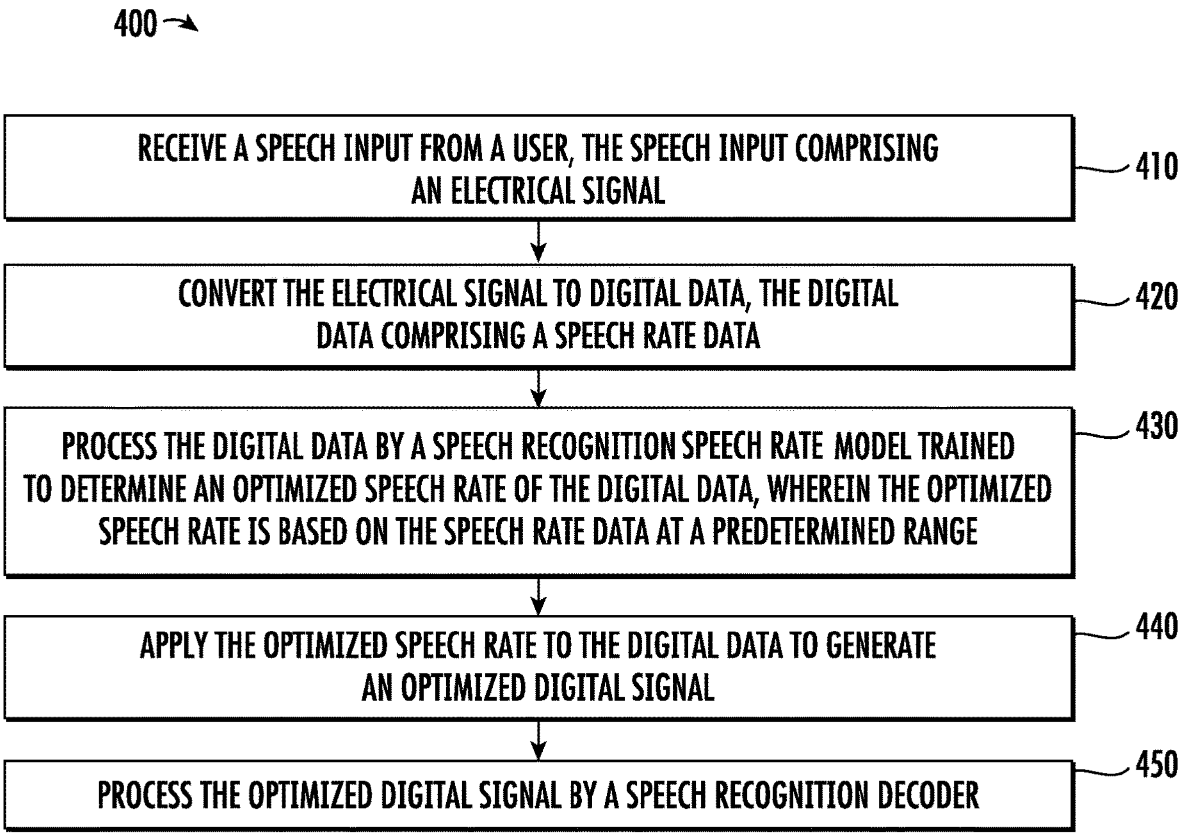

COLLECT TRAINING DATASETS FROM ONE OR MORE SPEECH RECOGNITION MODEL DEVELOPMENT TOOLS ⌐510

EXTRACTING SPEECH RECOGNITION ATTRIBUTES FROM THE TRAINING DATASETS TO CREATE A SPEECH RECOGNITION SPEECH RATE TRAINING CORPUS, WHEREIN THE SPEECH RECOGNITION ATTRIBUTES COMPRISE A FREQUENCY ATTRIBUTE ⌐520

TRAIN THE SPEECH RECOGNITION SPEECH RATE MODEL USING THE SPEECH RECOGNITION SPEECH RATE TRAINING CORPUS ⌐530

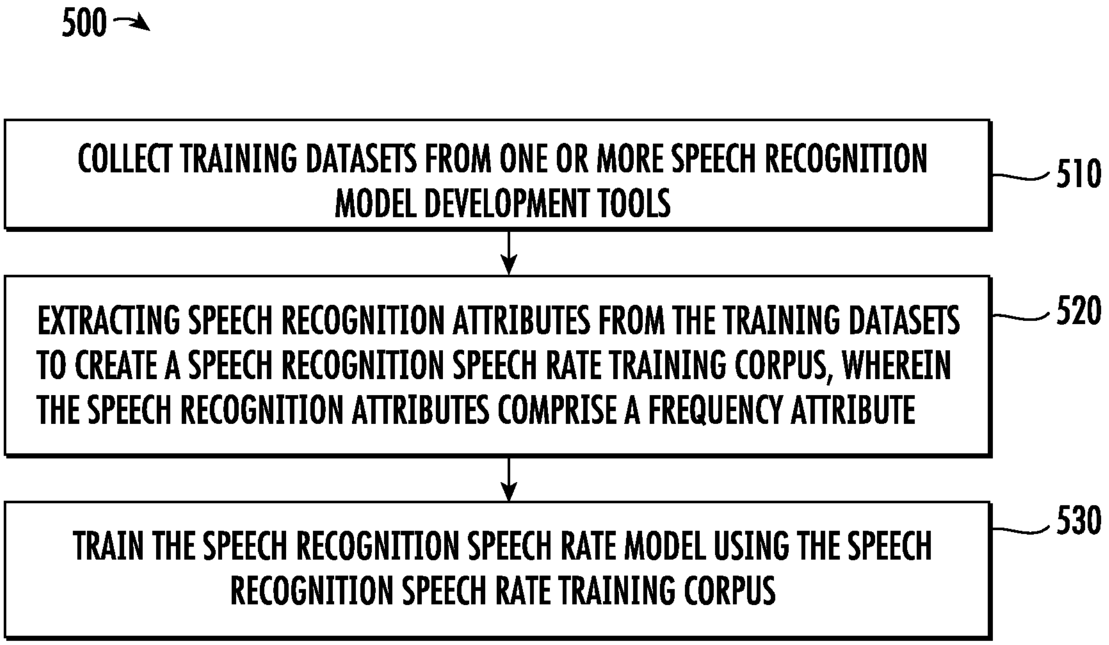

COMPARE THE SPEECH INPUT TO AN EXPECTED RESPONSE DATASET ⟋ 610

DETERMINE, BASED ON THE COMPARISON OF THE SPEECH INPUT TO THE
EXPECTED RESPONSE DATASET, THE SPEECH RATE DATA OVER A PERIOD OF
TIME OF THE SPEECH INPUT ⟋ 620

700

ACCESS A SPEECH INPUT FROM A USER AND A HINT DATA OBJECT ⟋710

PROCESS THE SPEECH INPUT TO GENERATE A PLURALITY OF HYPOTHESES OF THE SPEECH INPUT, WHEREIN EACH HYPOTHESIS OF THE PLURALITY OF HYPOTHESES COMPRISES A SEQUENCE OF HYPOTHESIS WORDS ⟋720

ASSIGN EACH HYPOTHESIS A CONFIDENCE SCORE ⟋730

COMPARE THE HINT DATA OBJECT TO EACH HYPOTHESIS OF THE PLURALITY OF HYPOTHESES TO DETERMINE AN OUTPUT HYPOTHESIS ⟋740

NO MATCH

YES MATCH

760

750

DETERMINE THE OUTPUT HYPOTHESIS COMPRISES A HIGHEST CONFIDENCE SCORE OF EACH HYPOTHESIS OF THE PLURALITY OF HYPOTHESES IN THE INSTANCE WHERE THE HINT DATA OBJECT FAILS TO MATCH A HYPOTHESIS OF THE PLURALITY OF HYPOTHESES

DETERMINE THE OUTPUT HYPOTHESIS COMPRISES THE HYPOTHESIS OF THE PLURALITY OF HYPOTHESES IN THE INSTANCE WHERE THE HINT DATA OBJECT MATCHES THE HYPOTHESIS OF THE PLURALITY OF HYPOTHESES

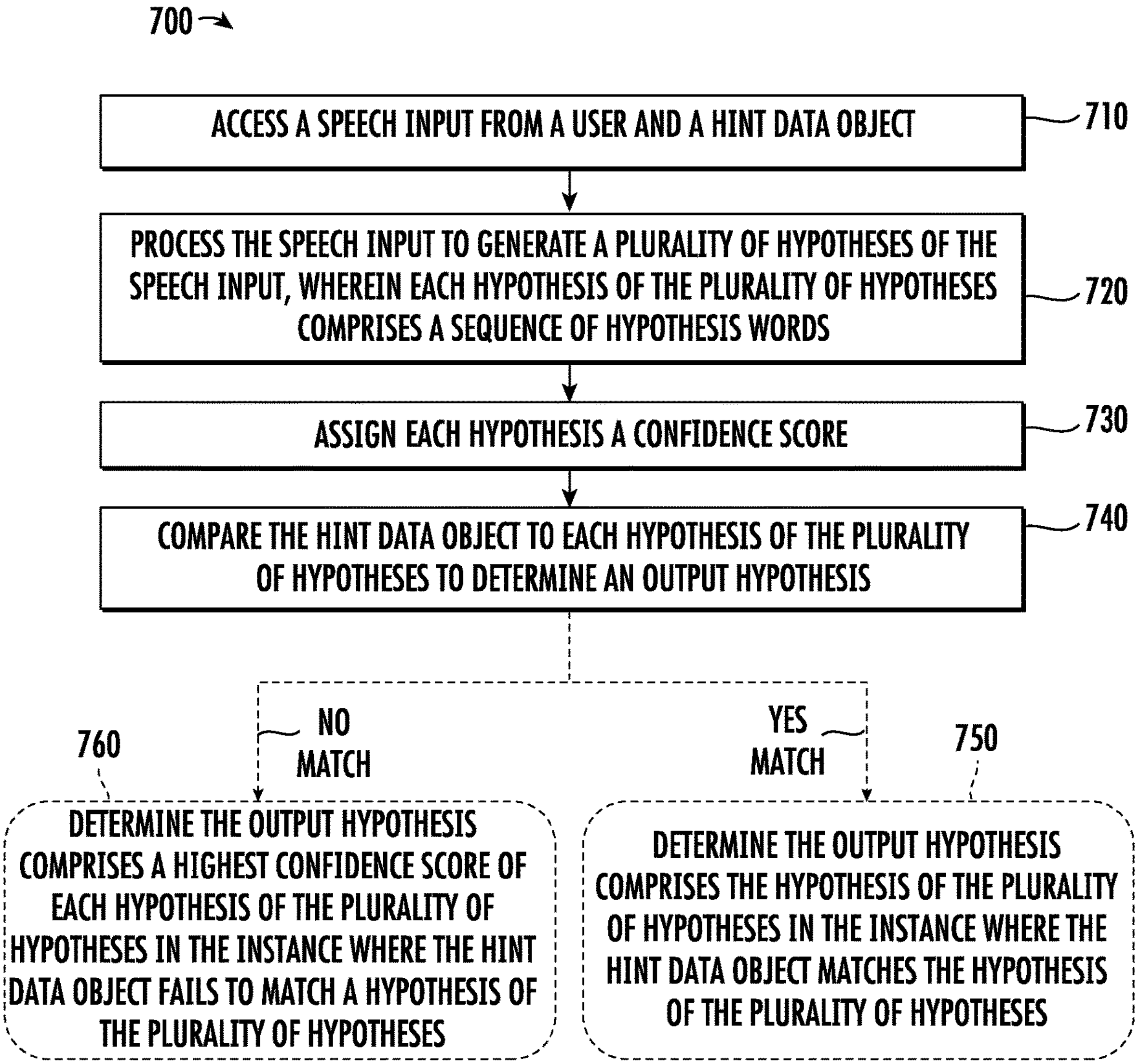

| |
|---|
| DETERMINE THE OUTPUT HYPOTHESIS BASED ON A COMPARISON OF THE HINT DATA OBJECT TO THE RECEIVED SPEECH INPUT |

—810

↓

| |
|---|
| DETERMINE AN EXTERNAL FACTOR OF THE USER BASED ON THE OUTPUT HYPOTHESIS |

—820

APPARATUSES, SYSTEMS, AND METHODS FOR SPEECH RECOGNITION BY SPEECH RATE AND HINT-BASED TECHNIQUES

BACKGROUND

Existing methods, apparatuses, and systems are plagued by challenges and limitations in speech recognition. For example, efficiency and/or accuracy of many speech recognition devices may be affected due to various factors such as the speech rate of input speech data, processing the input speech data at non-optimized frequencies, and recognizing speech based on hints external to the speech input.

BRIEF SUMMARY

In accordance with various examples of the present disclosure, various example methods, apparatuses, and systems for speech recognition are provided.

In some embodiments, a method for generating an optimized digital signal in a speech recognition system may comprise receiving a speech input from a user, the speech input comprising an electrical signal; converting the electrical signal to digital data, the digital data comprising a speech rate data; processing the digital data by a speech recognition speech rate model trained to determine an optimized speech rate of the digital data, wherein the optimized speech rate is based on the speech rate data being in a predetermined range; applying the optimized speech rate to the digital data to generate an optimized digital signal; and processing the optimized digital signal by a speech recognition decoder.

In some embodiments, the method for generating an optimized digital signal in a speech recognition system further comprises collecting training datasets from one or more speech recognition model development tools; extracting speech recognition attributes from the training datasets to create a speech recognition speech rate training corpus, wherein the speech recognition attributes comprise a frequency attribute; and training the speech recognition speech rate model using the speech recognition resampling training corpus.

In some embodiments, the predetermined range is determined by a range of speech recognition attributes, the range of speech recognition attributes comprising data from a plurality of users and wherein the predetermined range is generated based on normalization of the optimized speech rate for each of the speech recognition attributes.

In some embodiments, the method for generating an optimized digital signal in a speech recognition system further comprises comparing the speech input to a hint data object; and determining, based on the comparison of the speech input to the hint data object, the speech rate data over a period of time of the speech input.

In some embodiments, the speech recognition speech rate model is trained for each language identified in the speech recognition system.

In some embodiments, the speech input of the user is segmented from a plurality of speech inputs by the user, the segmentation of the speech input being based on at least one of a plurality of predetermined cutoff instances.

In some embodiments, an apparatus configured for generating an optimized digital signal, the apparatus comprising at least one processor and at least one memory, the at least one memory having computer-coded instructions therein, wherein the computer-coded instructions are configured to, in execution with the at least one processor, cause the apparatus to: receive a speech input from a user, the speech input comprising an electrical signal; convert the electrical signal to digital data, the digital data comprising a speech rate data; process the digital data by a speech recognition speech rate model trained to determine an optimized speech rate of the digital data, wherein the optimized speech rate is based on the speech rate data at an predetermined range; apply the optimized speech rate to the digital data to generate an optimized digital signal; and process the optimized digital signal by a speech recognition decoder.

In some embodiments, the computer-coded instructions of the apparatus configured for generating an optimized digital signal are further configured to cause the apparatus to: collect training datasets from one or more speech recognition model development tools; extract speech recognition attributes from the training datasets to create a speech recognition speech rate training corpus, wherein the speech recognition attributes comprise a frequency attribute; and train the speech recognition speech rate model using the speech recognition speech rate training corpus.

In some embodiments, the predetermined range is determined by a range of speech recognition attributes, the range of speech recognition attributes comprising data from a plurality of users and wherein the predetermined range is generated based on normalization of the optimized speech rate for each of the speech recognition attributes.

In some embodiments, the computer-coded instructions of the apparatus configured for generating an optimized digital signal are further configured to cause the apparatus to: compare the speech input to a hint data object; and determine, based on the comparison of the speech input to the hint data object, the speech rate data over a period of time of the speech input.

In some embodiments, the speech recognition speech rate model is trained for each language identified in the speech recognition system.

In some embodiments, the speech input of the user is segmented from a plurality of speech inputs by the user, the segmentation of the speech input being based on at least one of a plurality of predetermined cutoff instances.

In some embodiments, the computer-coded instructions of the apparatus configured for generating an optimized digital signal are further configured to cause the apparatus to: access a speech input from a user and a hint data object; process the speech input to generate a plurality of hypotheses related to the speech input, wherein each hypothesis of the plurality of hypotheses comprises a sequence of hypothesis words; assign each hypothesis a confidence score; and compare the hint data object to each hypothesis of the plurality of hypotheses to determine an output hypothesis.

In some embodiments, the confidence score assigned to each hypothesis further comprises a confidence score for each of the hypothesis words, and wherein the confidence score assigned to each hypothesis comprises an aggregation of the confidence score for each of the hypothesis words.

In some embodiments, the speech input of the user is segmented from a plurality of speech inputs by the user, the segmentation of the speech input being based on at least one of a plurality of predetermined cutoff instances.

In some embodiments, the computer-coded instructions of the apparatus configured for generating an optimized digital signal are further configured to cause the apparatus to: determine the output hypothesis based on a comparison of the hint data object to the received speech input; and determine an external factor of the user based on the output hypothesis.

In some embodiments, the computer-coded instructions of the apparatus configured for generating an optimized digital signal are further configured to cause the apparatus to: determine, in response to comparing the hint data object to each hypothesis of the plurality of hypotheses, the output hypothesis, wherein: the output hypothesis comprises a highest confidence score of each hypothesis of the plurality of hypotheses in the instance where the hint data object fails to match a hypothesis of the plurality of hypotheses, and the output hypothesis comprises the hypothesis of the plurality of hypotheses in the instance where the hint data object matches the hypothesis of the plurality of hypotheses.

In some embodiments, the hint data object comprises user data.

In some embodiments, a computer implemented method configured for generating an optimized digital signal in a speech recognition system, the computer implemented method comprising: receiving a speech input from a user, the speech input comprising an electrical signal; converting the electrical signal to digital data, the digital data comprising a speech rate data; processing the digital data by a speech recognition speech rate model trained to determine an optimized speech rate of the digital data, wherein the optimized speech rate is based on the speech rate data at a predetermined range; applying the optimized speech rate to the digital data to generate an optimized digital signal; and processing the optimized digital signal by a speech recognition decoder.

In some embodiments, the computer implemented method further comprises: collecting training datasets from one or more speech recognition model development tools; extracting speech recognition attributes from the training datasets to create a speech recognition speech rate training corpus, wherein the speech recognition attributes comprise a frequency attribute; and training the speech recognition speech rate model using the speech recognition speech rate training corpus.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other elements, unless described otherwise. Examples incorporating teachings of the present disclosure are shown and described with respect to the figures presented herein, in which:

FIG. 4 provides an example flowchart illustrating various processes and/or procedures for resampling received input speech, in accordance with various example embodiments of the present disclosure;

FIG. 5 provides an example flowchart illustrating various processes and/or procedures for training a speech recognition resampling model, in accordance with various example embodiments of the present disclosure;

FIG. 7 provides an example flowchart illustrating various processes and/or procedures for determining an output hypothesis based on a received hint data object of the speech recognition system, in accordance with various example embodiments of the present disclosure.

DETAILED DESCRIPTION

Overview

Figure 1:
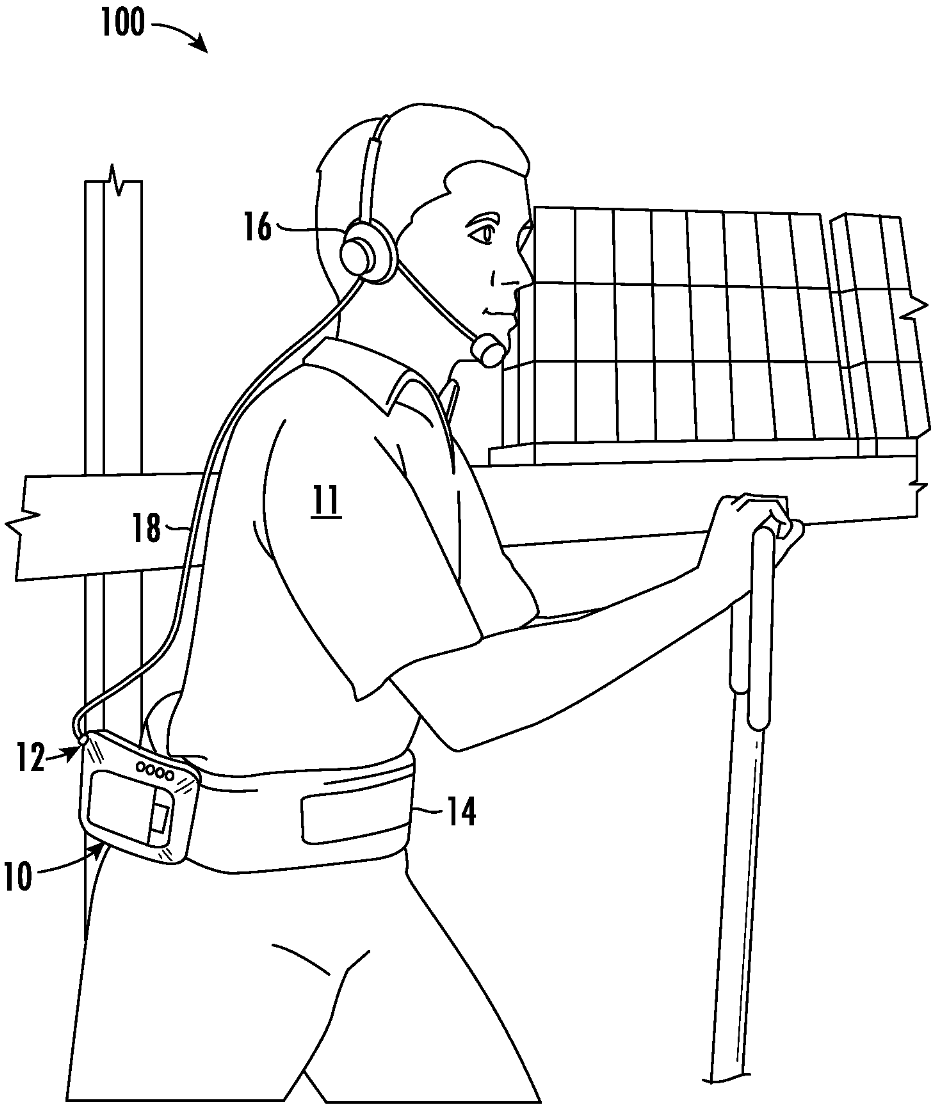
FIG. 1 provides a perspective view of a user using an exemplary speech recognition system in a typical work environment in accordance with various examples of the present disclosure.

Various example embodiments described herein address technical problems associated with speech recognition in speaker-independent systems, wherein speech provided by a plurality of users may comprise speech at different frequencies, different volumes, different pitches, different languages, different genders, and/or the like. Modern speech recognition devices are unable to determine and apply a speech rate for a plurality of speakers in one system such as a speaker-independent system. Instead, modern speaker-dependent systems may only generate policies for optimized speech rate based on specific users and their associated speech data and/or speech patterns on a case-by-case basis.

Various embodiments discussed herein can, in some examples, be utilized by a speech recognition server or service to generate an optimized digital signal based on an optimized speech rate that is speaker-independent and, based on said optimized digital signal, generate a hypothesis of the speech input based on external factors accessed and/or received at the time of the speech input, where such external factors may comprise hints regarding user location, user workflows, user identifiers, check-digit values, and/or the like. Such embodiments described herein may be further directed to generating the optimized digital signal based on previously received external factors comprising hints (e.g., expected responses from the user) to generate higher confidence in the speech recognition server or service. Such embodiments may improve over the prior art by improving accuracy and efficiency in speech recognition.

Example System Architecture

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Example embodiments disclosed herein embrace a speech recognition system to allow a user to speak into a speech recognition device, wherein the user may be speaking in response to queries or instructions as part of a workflow (e.g., warehouse operations), may be speaking based on previously-identified instructions (e.g., instructions provided by something other than the speech recognition device, such as printed instructions for the user), or speaking without prior instructions or querying (e.g., speaking of the user's own accord). FIG. 1 illustrates a perspective view of a user with an exemplary speech recognition system 100. The speech recognition system may include a mobile computing device 10 and a speech input/output device (e.g., headset) 16. The mobile computing device 10 may be a wearable device, that is worn by a user 11 (e.g., on a belt 14). The mobile computing device 10 may include at least one processor and at least one non-transitory storage medium (i.e., memory) (e.g., read-only memory, flash memory, and/or a hard-drive). The processor may facilitate speech recognition and other associated processing (e.g., logic, input/output, power management, communication, etc.). The headset 16 may be coupled to the portable terminal 12 by a cord 18 or by a wireless connection (e.g., near-field communication (NFC) or BLUETOOTH®). The headset may be worn on the head of the user 11. In some possible embodiments, the mobile computing device 10 may be integrated with the headset 16, eliminating the need for a separate mobile computing device 10.

A user speaks into the speech input device (e.g., microphone) of the headset 16, and the audio information is transferred to the mobile computing device. The processor in the mobile computing device may be configured to execute algorithms to recognize the speech. Alternatively, the host computer may be configured to execute the algorithms to recognize speech. In either case, the mobile computing device could communicate with the host computer wirelessly via a variety of protocols (e.g., IEEE 802.11, including WI-FI®, BLUETOOTH®, CDMA, TDMA, or GSM). U.S. patent application Ser. No. 10/671,142, entitled "Apparatus and Method for Detecting User Speech", incorporated herein by reference, further details the implementation of the system.

One particular area in which workers rely heavily on such wireless wearable computers is inventory management. Inventory-driven industries, in some examples, rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers, pickers and other workers. The workers handle the manual aspects of the integrated management system under the command and control of information transmitted from the central computer system to the wireless wearable computer.

As the workers complete their assigned tasks, a bi-directional communication stream of information is exchanged over a wireless network between wireless wearable computers and the central computer system. Information received by each wireless wearable computer from the central computer system is translated into voice instructions or text commands for the corresponding worker. Typically, the worker wears a headset coupled with the wearable device that has a microphone for voice data entry and an ear speaker for audio output feedback to the user. Responses from the worker are input into the wireless wearable computer by the headset microphone and communicated from the wireless wearable computer to the central computer system. Through the headset microphone, workers may pose questions, report the progress in accomplishing their assigned tasks, and report working conditions (e.g., inventory shortages). Using such wireless wearable computers, workers may perform assigned tasks virtually hands-free without equipment to juggle or paperwork to carry. Because manual data entry is eliminated or, at the least, reduced, workers can perform their tasks faster, more accurately, and more productively.

Typical to most voice data-entry applications (e.g., warehouse product picking/stocking) is the expectation of a user's response. In some dialogs, one or more particular responses (i.e., hint data objects) among the set of possible responses is known to be more likely than others are. These hint data objects may be used by the speech recognition system to improve recognition accuracy. For example, by determining the output hypothesis of the speech input based on a hint data object and after generating the optimized signal from the speech input, the speech recognition system may be used, in some examples, to predict the speech input without loss of speech input data and/or inaccuracy from high/low frequency speech input.

Figure 2:
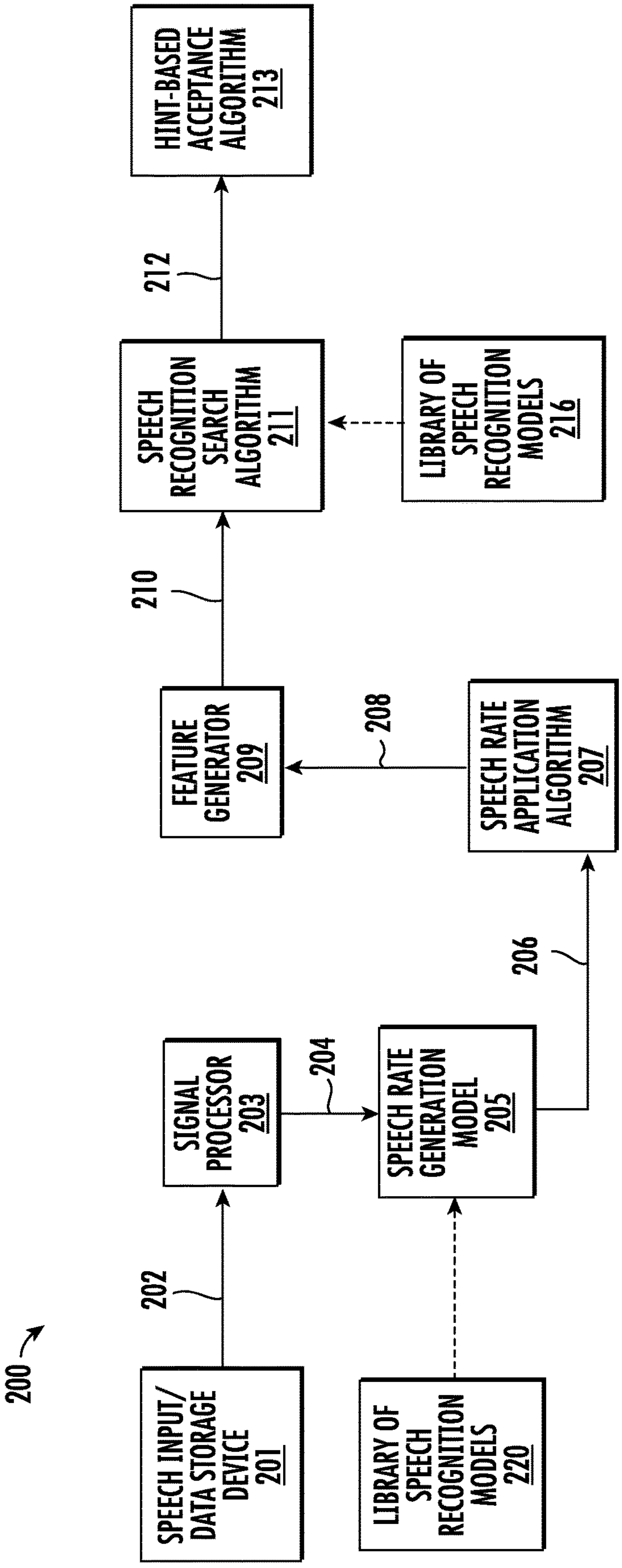
FIG. 2 provides an example schematic view of an exemplary system for recognizing speech in accordance with various examples of the present disclosure.
Figure 3:
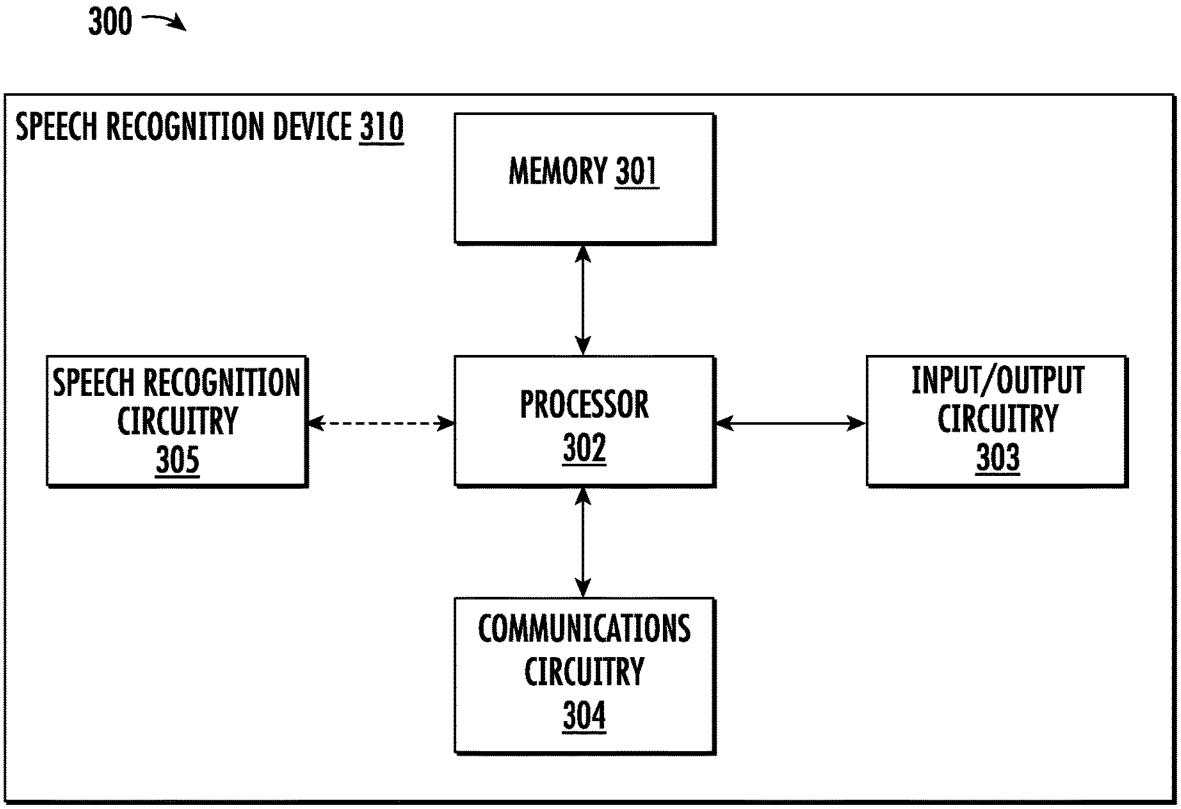
FIG. 3 provides an example speech recognition device comprising speech recognition circuitry in accordance with various examples of the present disclosure.

FIG. 2 illustrates a schematic view of the speech recognition system 200, according to example embodiments described herein. In some examples, embodiments can be implemented using various hardware and/or software configurations. For example, such a hardware configuration may be shown in FIGS. 1 and/or 3, wherein FIG. 3 is explained in further detail below. One particular example of the various hardware and/or software implementations is within a portable or wearable computer that is used for voice-directed work or voice directions, in general. Other implementations are possible as well, and the embodiments described herein are not limited to such voice-directed work applications, and may include any such implementations requiring speech recognition at different speech rates or including different hint data objects.

In the course of recognizing speech by the speech recognition system, the speech recognition system may recognize speech input from a user as it is spoken into a speech recognition device, such as that shown as the headset 16 of FIG. 1. For instance, during the course of a dialog, a user 11 vocalizes a speech input which is then received by device 201 (e.g., such as headset 16 and/or a microphone). The speech input device 201 converts this sound into an electronic signal 202 to be input into a signal processor 203 for conversion from an analog signal to a digital signal 204. The digital signal 204 may then be generated based on the speech rate generation model 205 in order to determine an optimized speech rate 206 of the digital data based on both the received digital data of the speech input and based on previously generated and stored speech input data by a variety of users. Once an optimized speech rate for the digital data of the speech input has been determined, and in some embodiments, a speech rate application algorithm 207 may be used to apply the optimized speech rate to the digital data to generate an optimized digital signal 208. The optimized digital signal 208 may then be processed by a speech recognition decoder, such as the feature generator 209, speech recognition search algorithm 211, and/or the hint-based acceptance algorithm 213 to determine an output hypothesis.

The optimized digital signal 208 may be processed by a feature generator 209 in order to generate features of the optimized digital signal. For example, and in some embodiments, the optimized digital signal may be split into a sequence of time-slices, or frames before processing by the feature generator 209. In some embodiments, and once the optimized digital signal has been sliced into frames, the features 210 generated by the feature generator 209 may include a vector, matrix, or otherwise organized set of numbers representing the acoustic features 210 of the frames. The optimized digital signal, or any data derived from it that describes the acoustic properties of the speech input, such as features 210, may be known as acoustic data. In some embodiments, the features 210 may be processed by a speech recognition search algorithm 211, which may be configured by hardware and/or software, in order to analyze the features 210 to determine a hypothesis (e.g., which may be determined from a plurality of hypotheses 211) that best matches the speech input 201. The speech recognition search algorithm 211 may produce a plurality of potential hypotheses 212 based on the analyzation of the features 210, and the plurality of hypotheses 212 may be rated based on a confidence score (also contained in data 212 transmitted between the speech recognition search algorithm 211 and the hint-based acceptance algorithm 213) attached to each hypothesis of the plurality of hypotheses. The confidence score of each hypothesis may be used to determine a first hypothesis to a last hypothesis, wherein the first hypothesis may comprise a highest confidence score as compared to the other hypotheses within the plurality of hypotheses 212. In some embodiments, the hint-based acceptance algorithm 213 may process the plurality of hypotheses 212 in order to return an output hypothesis based on at least one of a hint accessed by the system which was attached with the speech input 201 and/or a confidence score if none of the hypotheses comprise data which match the hint accessed by the system.

In some embodiments, and as shown in FIG. 3, the speech recognition search algorithm uses probabilistic models from a library of models 216 stored in memory to recognize the features 210 of the optimized digital signal 208, such that the speech input 201 can be recognized. Some library models (i.e., models) may be user customized (i.e., updated) to a particular user, while some models may be generic to all users (e.g., speaker-independent). In some embodiments, the library models (i.e., models) may be language-customized to particular languages of the world, but generic to all users within the language. In some embodiments, the library of models may comprise a model trained for each speech recognition attribute (e.g., frequency attribute(s), pitch attribute(s), volume attribute(s), pause attribute(s), language attribute(s), user identifier attribute(s) of each speaker associated with the captured speech input data (e.g., an associated User ID), gender attribute(s), and/or the like).

FIG. 3 provides an example schematic block diagram of example circuitry 300, some or all of which may be included in a speech recognition server 310. In accordance with some example embodiments, the speech recognition server 310 may include various means, such as memory 301, processor 302, input/output circuitry 303, and/or communications circuitry 304. Moreover, in some embodiments, speech recognition circuitry 305 may also or instead be included in the speech recognition server 310. For example, where speech recognition circuitry 305 is included in speech recognition server 310, speech recognition circuitry 305 may be configured to facilitate the functionality discussed herein regarding generating an optimized digital signal to determine an output hypothesis of the speech input and/or generating an output hypothesis based on accessed speech input and hint data object(s). An apparatus, such as speech recognition server 310, may be configured, using one or more of the circuitry 301, 302, 303, 304, and 305, to execute the operations described above with respect to FIGS. 1 and 2 and below in connection with FIGS. 4, 5, 6, 7 and 8.

Although the use of the term "circuitry" as used herein with respect to components 301-305 are described in some cases using functional language, it should be understood that the particular implementations necessarily include the use of particular hardware configured to perform the functions associated with the respective circuitry as described herein. It should also be understood that certain of these components 301-305 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the speech recognition server 310 may be housed within this device, while other components are housed within another of these devices, or by yet another device not expressly illustrated in FIGS. 1 and/or 2.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the speech recognition server 310 may provide or supplement the functionality of particular circuitry. For example, the processor 302 may provide processing functionality, the memory 301 may provide storage functionality, the communications circuitry 304 may provide network interface functionality, and the like.

In some embodiments, the processor 302 (and/or co-processor or any other processing circuitry assisting or otherwise associated with the processor) may be in communication with the memory 301 via a bus for passing information among components of, for example, speech recognition server 310. The memory 301 is non-transitory and may include, for example, one or more volatile and/or non-volatile memories, or some combination thereof. In other words, for example, the memory 301 may be an electronic storage device (e.g., a non-transitory computer readable storage medium). The memory 301 may be configured to store information, data, content, applications, instructions, or the like, for enabling an apparatus, e.g., speech recognition server 310, to carry out various functions in accordance with example embodiments of the present disclosure.

Although illustrated in FIG. 3 as a single memory, memory 301 may comprise a plurality of memory components. The plurality of memory components may be embodied on a single computing device or distributed across a plurality of computing devices. In various embodiments, memory 301 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 301 may be configured to store information, data, applications, instructions, or the like for enabling speech recognition server 310 to carry out various functions in accordance with example embodiments discussed herein. For example, in at least some embodiments, memory 301 is configured to buffer data for processing by processor 302. Additionally or alternatively, in at least some embodiments, memory 301 is configured to store program instructions for execution by processor 302. Memory 301 may store information in the form of static and/or dynamic information. This stored information may be stored and/or used by speech recognition server 310 during the course of performing its functionalities.

Processor 302 may be embodied in a number of different ways and may, for example, include one or more processing devices configured to perform independently. Additionally, or alternatively, processor 302 may include one or more processors configured in tandem via a bus to enable independent execution of instructions, pipelining, and/or multithreading. Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 3 as a single processor, in some embodiments, processor 302 comprises a plurality of processors. The plurality of processors may be embodied on a single computing device or may be distributed across a plurality of such devices collectively configured to function as speech recognition server 310. The plurality of processors may be in operative communication with each other and may be collectively configured to perform one or more functionalities of speech recognition server 310 as described herein.

In an example embodiment, processor 302 is configured to execute instructions stored in the memory 301 or otherwise accessible to processor 302. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure processor 302 to perform one or more algorithms and/or operations described herein when the instructions are executed. For example, these instructions, when executed by processor 302, may cause speech recognition server 310 to perform one or more of the functionalities of speech recognition server 310 as described herein.

In some embodiments, speech recognition server 310 further includes input/output circuitry 303 that may, in turn, be in communication with processor 302 to provide an audible, visual, mechanical, or other output and/or, in some embodiments, to receive an indication of an input from a user, a mobile computing device 10, headset 16, speech input/data storage device 201, or another source. In that sense, input/output circuitry 303 may include means for performing analog-to-digital and/or digital-to-analog data conversions, such as the signal processor 203 and/or the like. Input/output circuitry 303 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 303 may comprise a user interface and may comprise a web user interface, a mobile application, a kiosk, or the like, to present to a user of the speech recognition system an output hypothesis and/or request user input. The processor 302 and/or user interface circuitry comprising the processor 302 may be configured to control one or more functions of a display or one or more user interface elements through computer program instructions (e.g., software and/or firmware) stored on a memory accessible to the processor 302 (e.g., memory 201, and/or the like). In some embodiments, aspects of input/output circuitry 303 may be reduced as compared to embodiments where speech recognition server 310 may be implemented as an end-user machine or other type of device designed for complex user interactions. In some embodiments (like other components discussed herein), input/output circuitry 303 may even be eliminated from speech recognition server 310. Input/output circuitry 303 may be in communication with memory 301, communications circuitry 304, and/or any other component(s), such as via a bus. Although more than one input/output circuitry and/or other component can be included in speech recognition server 310, only one is shown in FIG. 3 to avoid overcomplicating the disclosure (e.g., like the other components discussed herein).

Communications circuitry 304, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with speech recognition server 310. In this regard, communications circuitry 304 may include, for example, a network interface for enabling communications with a wired or wireless communication network. For example, in some embodiments, communications circuitry 304 is configured to receive and/or transmit any data that may be stored by memory 301 using any protocol that may be used for communications between computing devices. For example, communications circuitry 304 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 304 includes circuitry for interacting with the antenna(s) to cause transmission of signals via the antenna(e) or to handle receipt of signals received via the antenna(e). These signals may be transmitted by speech recognition server 310 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 304 may additionally or alternatively be in communication with the memory 301, input/output circuitry 303 and/or any other component of speech recognition server 310, such as via a bus.

In some embodiments, speech recognition circuitry 305 may also or instead be included and configured to perform the functionality discussed herein related to generating an optimized digital signal and/or determining an output hypothesis of the speech input based on an accessed hint(s). In some embodiments, speech recognition circuitry 305 includes hardware, software, firmware, and/or a combination of such components, configured to support various aspects of such speech recognition-related functionality, features, and/or services of the speech recognition server 310 as described herein (e.g., designed to generate an optimized digital signal and determine an output hypothesis of the speech input based on an accessed hint based at least on the received speech input data, optimized digital data from the received speech input, and the accessed hint associated with the speech input). It should be appreciated that in some embodiments, speech recognition circuitry 305 performs one or more of such exemplary actions in combination with another set of circuitry of the speech recognition server 310, such as one or more of memory 301, processor 302, input/output circuitry 303, and communications circuitry 304. For example, in some embodiments, speech recognition circuitry 305 utilizes processing circuitry, such as the processor 302 and/or the like, to perform one or more of its corresponding operations. In some instances, the speech recognition circuitry 305 may generate an optimized digital signal for the received speech input, processing the optimized digital signal by a decoder to determine a hypothesis, determine the hypothesis based on a matching of an accessed hint to a plurality of potential hypotheses of the optimized digital signal, and/or the like. In a further example, in some embodiments, some or all of the functionality of the speech recognition circuitry 305 may be performed by processor 302. In this regard, some or all of the example processes and algorithms discussed herein can be performed by at least one processor 302 and/or speech recognition circuitry 305. It should also be appreciated that, in some embodiments, speech recognition circuitry 305 may include a separate processor, specially configured field programmable gate array (FPGA), or application specific interface circuit (ASIC) to perform its corresponding functions.

Additionally or alternatively, in some embodiments, speech recognition circuitry 305 utilizes memory 301 to store collected information. For example, in some implementations, speech recognition circuitry 305 includes hardware, software, firmware, and/or a combination thereof, that interacts with memory 301 to send, retrieve, update, and/or store data values embodied by and/or associated with speech input/data storage device, user identifier(s), workflow(s) associated with each user, acoustic values, analog signals, digital signals, optimized digital signals, resampling values, speech recognition models, resampling application algorithm(s), feature(s) of the optimized digital signals and/or non-optimized digital signals (e.g., digital signal(s) 204), speech recognition search algorithm(s), speech recognition model(s), check-digits, hint(s), and/or the like, that is configured for association with, for example, generating an optimized digital signal and/or determining an output hypothesis, and to support the operations of the speech recognition circuitry 305 and the remaining circuitry. Additionally or alternatively, in some embodiments, speech recognition circuitry 305 utilizes input/output circuitry 303 to facilitate user output (e.g., causing rendering of one or more user interface(s) which may, in some embodiments, comprise an output hypothesis associated with the user input speech, location data of the user, workflow(s) associated with the user, prompt(s), and/or the like), and/or to receive user input (e.g., user speech and/or the like). Additionally or alternatively still, in some embodiments, the speech recognition circuitry 305 utilizes communications circuitry 304 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of speech recognition server 310 to implement various operations, including the examples shown herein. As such, a series of computer-readable program code portions may be embodied in one or more computer program products and can be used, with a device, speech recognition server 310, database, and/or other programmable apparatus, to produce the machine-implemented processes discussed herein. It is also noted that all or some of the information discussed herein can be based on data that is received, generated and/or maintained by one or more components of the speech recognition server 310. In some embodiments, one or more external systems (such as a remote cloud computing and/or data storage system) may also be leveraged to provide at least some of the functionality discussed herein.

Example Operations for Generating an Optimized Digital Signal for Processing by a Speech Recognition Decoder to Determine an Output Hypothesis FIG. 4 provides an example flowchart 400 illustrating various processes, operations, and/or procedures for resampling received input speech, in accordance with various example embodiments. The operations illustrated in FIG. 4 may, for example, be performed by, with the assistance of, and/or under the control of one or more apparatuses, such as the speech recognition server 310, as described above. In this regard, performance of the operations may invoke one or more of memory 301, processor 302, input/output circuitry 303, communications circuitry 304, and/or speech recognition circuitry 305. Certain operations may be considered optional, as indicated by dashed lines.

As shown in operation 410, the apparatus (e.g., the speech recognition server 310) includes means, such as processor 302, input/output circuitry 303, communications circuitry 304, speech recognition circuitry 305, and/or the like, for receiving a speech input from a user. In some embodiments, the speech input of the user may be captured sound data captured by a device, such as a microphone by the apparatus and such speech input may, in some embodiments, comprise an electrical signal. The captured speech input by the user may be captured by an electro-acoustical device (e.g., a microphone) senses the speech input and converts it into an analog voltage signal. In some embodiments, stored speech input data may be used by the apparatus (e.g., the speech recognition server 310) to determine an optimized digital signal for the received speech input. In such embodiments, the apparatus may receive the stored speech input from a speech data repository (e.g., a memory 301), which may be used to determine a previously captured speech input to generate an optimized digital signal of the previous speech input in order to train a model to determine an optimized speech rate for the previous speech input (e.g., historical speech input data) and speech input received in real-time.

In some embodiments, the speech input comprises spoken words by the user, numbers spoken by the user, check-digits spoken by the user, phrases comprising multiple words, sound data retrieved by the electro-acoustical device such as background noise, silence, and/or the like.

In some embodiments, the received speech input may be segmented in real-time by the apparatus based on a predetermined cutoff instance. For example, a predetermined cutoff instance may comprise prolonged periods of silence, abrupt changes in volume in the speech input, gradual changes in volume followed by a short period of silence, abrupt changes in pitch in the speech input, gradual changes in pitch followed by a short period of silence, and/or the like. In some embodiments, and where the predetermined cutoff instance comprises a prolonged period of silence, this may be used to indicate to the apparatus that the user has stopped speaking into the speech input device (e.g., microphone) and the received speech input from the period leading up to the silence should be used for conversion to a digital signal in accordance with the exemplary embodiments of the disclosure.

In addition to and/or in other embodiments, the predetermined cutoff instance may comprise abrupt changes in volume and/or pitch in the speech input. For example, such an abrupt change in volume or pitch may indicate that a user of the apparatus has asked a question or ended a specific sequence of words with a particularly important word (e.g., a word considered to be more important than the surrounding words in a sequence of words may comprise a higher pitch for emphasis). In some embodiments, the predetermined cutoff instance may comprise an abrupt or gradual change in pitch or volume followed by a pause in speech (e.g., a short or long pause depending on the predetermined cutoff instance parameters). For example, such a change in pitch or volume followed by a pause in speech may further indicate that the user has ended their sequence of words and the speech from the period leading up to the cutoff instance should be received and an electrical signal from the period leading up to the cutoff instance should be converted to digital data.

In some embodiments, the speech input may comprise expected phrases (i.e., hint data objects) of speech data in order to determine a specific range of speech input (e.g., a specified number of words received as a range of speech input based on the expected phrases). For example, if the expected phrase comprises only 4 words, the received speech input may cutoff the received speech input after 4 words have been received by the electro-acoustical device. In some embodiments, the hint data object may comprise an anchor word and/or anchor digit to indicate to the speech recognition device, the speech input device (e.g., speech input device 201), speech processor (e.g., speech processor 203), speech recognition server 310, and/or the like that the utterance is finished. By way of non-limiting example, an anchor word may comprise terms such as "ready," "finish," "off," and/or the like. Further embodiments of the speech input are discussed below in detail with respect to FIG. 6.

As shown in operation 420, the apparatus (e.g., the speech recognition server 310) includes means, such as processor 302, input/output circuitry 303, communications circuitry 304, speech recognition circuitry 305, and/or the like, for converting the electrical signal to digital data, the digital data comprising speech rate data. For example, and in some embodiments, the electrical signal (e.g., based on real-time received speech input or historical speech input data received from a speech data repository) may be processed by a signal processor (e.g., such as processor 302 and/or signal processor 203) to convert the electrical signal from analog to digital by an analog-to-digital converter(s), filters, and equalization circuitry to convert the electrical signal to a digitize stream of data (e.g., output 204 from signal processor 203).

In some embodiments, the digital data converted from the electrical signal may comprise a range of digital data without outlier digital data. For example, and in some embodiments, when converting the electrical signal to digital data, the apparatus may be trained to drop outlying data points in the electrical signal such as data points comprising background noise which may comprise sound data that is low in volume and indicates low background noise/far-away background noise and/or sound data that is loud in volume but does not match the surrounding data points of the user's speech input data (e.g., a loud noise interrupting the user's speech input such as a crashing sound in a warehouse where the user is working). In some embodiments, the apparatus may drop the sound data that is low in volume and/or high in volume compared to the speech input provided by the user after the electrical signal has been converted to digital data.

In some embodiments, the digital data may comprise speech rate data comprising a calculated, measured, and/or determined ratio of spoken words of the speech input to the time elapsed in the speech input. For example, a speech rate data may comprise the measure of words spoken in the bounded time period of speech input divided by the time period of the speech input (e.g., if a user spoke five words over a period of five seconds, the speech rate data may comprise a one:one ratio of words to seconds and/or an average of one word per one second). The speech rate data calculation is further discussed below with respect to FIG. 6.

In some embodiments, the optimal speech rate may be estimated based on previously decoded utterances that have been determined to match output hypotheses and/or hint data objects. For instance, previously decoded utterances (e.g., historical speech input data) may be matched to output hypotheses and/or hint data objects to determine a speech rate data by measuring the amount of words over the period of time the utterance was captured. Such a matching between previously decoded utterances and the output hypothesis based on the hint data objects may be used to estimate a speech rate data of a received speech input (e.g., a speech input received in the future and/or in real-time). In some embodiments, as more utterances of historical speech input data are processed within the speech recognition system (e.g., by the speech recognition server 310), the estimated speech rate data may be reprocessed and a confidence score may be calculated to determine the speech rate data.

As shown at operation 430 the apparatus (e.g., the speech recognition server 310) includes means, such as processor 302, input/output circuitry 303, communications circuitry 304, speech recognition circuitry 305, and/or the like, for processing the digital data by a speech recognition resampling model trained to determine an optimized speech rate of the digital data, wherein the optimized speech rate is based on the speech rate data at a predetermined range. By way of example, the digital data may be processed by the speech recognition resampling model in order to generate and/or determine an optimized speech rate for the input digital data. Such an optimized speech rate may be based on a plurality of factors, including but not limited to the specified speech rate data of the digital data, a predetermined range determined by the speech recognition resampling model prior to processing of the digital data, and/or a predetermined range determined by the speech recognition resampling model in real-time based on a plurality of uttered speech inputs received from the user over a specified time period (e.g., within the previous few hours, within the previous thirty minutes, within some specified period of time leading up to the last speech input provided by the user, over a specified plurality of speech inputs provided by the user, etc.), or the like. By way of non-limiting example, the predetermined range of previously collected data (e.g., historical input speech data) may be determined based on the historical speech input data and an associated error rate of the speech rate data for the decoded historical input speech data. Based on this measured/calculated error rate of the speech rate data for the historical input speech data, the predetermined range may be determined for a plurality of speakers with the predetermined range comprising the lowest error rate. For example, the lowest error rate may comprise a predetermined tolerance that may be determined as allowable within the speech recognition system.

In some embodiments, a real-time determination of the predetermined range may be determined by an apparatus (e.g., a speech recognition server 310), which may be based on a plurality of decoded utterances collected over the specified time period leading up to the real-time reception of speech input by the speaker (e.g., previously collected and decoded speech input within the previous few hours, within the previous thirty minutes, within some specified period of time leading up to the last speech input provided by the user, over a specified plurality of speech inputs provided by the user, etc.). Based on the previously decoded utterances of the speaker and un-decoded utterances (e.g., before processing by the speech recognition resampling model), the apparatus may process each of the un-decoded utterances with a plurality of predetermined ranges of the speech rate data and measure the impact (i.e., error rate) of each of the predetermined ranges with the un-decoded utterances and the associated decoded utterances to determine the correct predetermined range in real-time for a specific user. In some embodiments, the same process of calculating the error rate or impact of un-decoded utterances to associated decoded utterances may be used for a plurality of speakers and/or users.

In some embodiments, the speech recognition resampling model is trained by at least one of a plurality of attributes that make up a speech recognition resampling training corpus. Such methods 500 to train the speech recognition resampling model are described in more detail below with reference to FIG. 5. In still further embodiments, the speech recognition resampling model may comprise a plurality of machine learning models and/or convolutional neural networks. For instance, the speech recognition resampling model may comprise at least one of a linear regression model (e.g., trained based on a statistical modeling technique based on at least one of the plurality of attributes used to train the speech recognition resampling model), non-linear regression (e.g., trained based on a statistical modeling technique for attributes comprising a non-linear relationship), a regression tree, and/or a neural network (e.g., such as a shallow neural network or deep neural network).

In some embodiments, a Hidden Markov Model (HMM) may be used to determine the optimized speech rate of the digital data. For example, the HMM may be designed to recognize patterns in the plurality of attributes used to generate the speech recognition resampling training corpus and continuously update based on previously generated optimized speech rates from each of the attributes and/or training corpuses.

As shown at operation 440 the apparatus (e.g., the speech recognition server 310) includes means, such as processor 302, input/output circuitry 303, communications circuitry 304, speech recognition circuitry 305, and/or the like, for applying the optimized speech rate to the digital data to generate an optimized digital signal. By way of non-limiting example, a resampling application algorithm may be applied to the digital data to generate the optimized digital signal, wherein the resampling application algorithm may apply the optimized speech rate generated at operation 430 to the digital data. For example, the resampling application algorithm may multiply the optimized speech rate to the digital data in order to speed up or slow down the digital data to an optimized speech rate without affecting other attributes of the speech signal, such as volume or pitch (e.g., an optimized digital signal of the optimized speech rate). By way of non-limiting example, an application of the optimized speech rate to the digital data improves over prior systems by resampling the speech rate of the input speech of the user to a rate for optimized decoding and generation of speech recognition data (e.g., an output hypothesis).

As shown at operation 450 the apparatus (e.g., the speech recognition server 310) includes means, such as processor 302, input/output circuitry 303, communications circuitry 304, speech recognition circuitry 305, and/or the like, for processing the optimized digital signal by a speech recognition decoder. In some embodiments, the optimized digital signal (e.g., optimized digital signal 208) may be input into a decoder such as that shown as the feature generator 209, speech recognition search algorithm 211, hint-based acceptance algorithm 213, and/or library of speech recognition models 216. By way of non-limiting example, the rate of speech of the optimized digital signal may be used by the decoder to improve efficiency and accuracy in determining hypotheses for the input speech over previous non-optimized digital signals which may have lost digital data of the speech input and/or lost accuracy in predicting hypotheses of the digital data based on speech spoken too fast or too slow by a user.

FIG. 5 provides an example flowchart illustrating various processes, operations, and/or procedures for training a speech recognition resampling model, in accordance with various example embodiments. The operations illustrated in FIG. 5 may, for example, be performed by, with the assistance of, and/or under the control of one or more apparatuses, such as the speech recognition server 310, as described above. In this regard, performance of the operations may invoke one or more of memory 301, processor 302, input/output circuitry 303, communications circuitry 304, and/or speech recognition circuitry 305. Certain operations may be considered optional, as indicated by dashed lines.

As shown at operation 510 the apparatus (e.g., the speech recognition server 310) includes means, such as processor 302, input/output circuitry 303, communications circuitry 304, speech recognition circuitry 305, and/or the like, for collecting training datasets from one or more speech recognition model development tools. In some embodiments, the one or more speech recognition model development tools may comprise a plurality of training datasets comprising previously captured speech input data (e.g., historical speech input data) for a plurality of users of the speech recognition system, each comprising at least one of a plurality of attributes, such as a frequency attribute and/or the like (e.g., speech recognition attributes such as pitch attribute(s), volume attribute(s), pause attribute(s), language attribute(s), user identifier attribute(s) of each speaker associated with the captured speech input data (e.g., an associated User ID), gender attribute(s), and/or the like). Each of which is described in further detail below with respect to operation 520.

As shown at operation 520 the apparatus (e.g., the speech recognition server 310) includes means, such as processor 302, input/output circuitry 303, communications circuitry 304, speech recognition circuitry 305, and/or the like, for extracting speech recognition attributes from the training datasets to create a speech recognition resampling training corpus, wherein the speech recognition attributes comprise a frequency attribute. In some embodiments, the speech recognition attributes may comprise a plurality of attributes comprising at least one of a pitch attribute, a volume attribute, a pause attribute, and/or a frequency attribute.

In some embodiments, the speech recognition model used to determine the optimized digital signal may be gender neutral and speaker-independent and may comprise a speech recognition resampling training corpus using speech recognition attributes comprising at least one of a pitch attribute (s), volume attribute(s), pause attribute(s), frequency attribute(s), and/or language attribute(s).

The term "frequency attribute" may refer to data, identifiers, metadata, or other related speech or sound related characteristics associated with frequency or features that are extracted from training datasets and used to create a speech recognition resampling training corpus. In some embodiments, the frequency attributes are extracted from training datasets comprising previously captured speech input (e.g., historical speech input data) by, in some embodiments, a speech recognition resampling service (e.g., speech recognition resampling service 221). In some embodiments, the frequency attribute(s) may comprise frequency identifier(s), the frequency identifier referring to one or more items of data by which a frequency in sound may be identified within the speech recognition system. For example, the frequency identifier may comprise text string(s), numerical character (s), alphabetical character(s), alphanumeric code(s), ASCII character(s), a pointer, a sample of sound, other unique identifier, or a combination thereof. By way of non-limiting example, the frequency attribute (e.g., by way of a frequency identifier) may identify words over a period of time for the associated historical speech input data (e.g., a speech rate data of the historical speech input data such as if a user spoke ten words over a twenty second period, the frequency attribute of the specific historical speech input data may comprise a one word to two second ratio and/or a rate of one words for every two seconds).

The term "pitch attribute" may refer to data, identifiers, metadata, or other related speech or sound related characteristics associated with pitch or features that are extracted from training datasets and used to create a speech recognition resampling training corpus. In some embodiments, the pitch attributes are extracted from training datasets comprising previously captured speech input (e.g., historical speech input data) by, in some embodiments, a speech recognition resampling service (e.g., speech recognition resampling service 221). In some embodiments, the pitch attribute(s) may comprise pitch identifier(s), the pitch identifier referring to one or more items of data by which a pitch may be identified within the speech recognition system. For example, the pitch identifier may comprise text string(s), numerical character(s), alphabetical character(s), alphanumeric code(s), ASCII character(s), a pointer, a sample of sound, other unique identifier, or a combination thereof. By way of non-limiting example, the pitch attribute (e.g., by way of a pitch identifier) may identify the frequency of sound for the associated historical speech input data (e.g., how high or low the historical speech input data sounds over the speed of vibrations).

The term "volume attribute" may refer to data, identifiers, metadata, or other related speech or sound related characteristics associated with volume or features that are extracted from training datasets and used to create a speech recognition resampling training corpus. In some embodiments, the volume attributes are extracted from training datasets comprising previously captured speech input (e.g., historical speech input data) by, in some embodiments, a speech recognition resampling service (e.g., speech recognition resampling service 221). In some embodiments, the volume attribute(s) may comprise volume identifier(s), the volume identifier referring to one or more items of data by which a volume may be identified within the speech recognition system. For example, the volume identifier may comprise text string(s), numerical character(s), alphabetical character (s), alphanumeric code(s), ASCII character(s), a pointer, a sample of sound, other unique identifier, or a combination thereof. By way of non-limiting example, the volume attribute (e.g., by way of a volume identifier) may identify the loudness or intensity of sound for the associated historical speech input data (e.g., the strength of vibrations).

The term "pause attribute" may refer to data, identifiers, metadata, or other related speech or sound related characteristics associated with pauses or features that are extracted from training datasets and used to create a speech recognition resampling training corpus. In some embodiments, the pause attributes are extracted from training datasets comprising previously captured speech input (e.g., historical speech input data) by, in some embodiments, a speech recognition resampling service (e.g., speech recognition resampling service 221). In some embodiments, the pause attribute(s) may comprise pause identifier(s), the pause identifier referring to one or more items of data by which a pause in sound may be identified within the speech recognition system. For example, the pause identifier may comprise text string(s), numerical character(s), alphabetical character(s), alphanumeric code(s), ASCII character(s), a pointer, a sample of sound, other unique identifier, or a combination thereof. By way of non-limiting example, the pause attribute (e.g., by way of a pause identifier) may identify silence or an extremely low volume of sound for the associated historical speech input data (e.g., a lack of vibrations). In some embodiments, the pause attribute may be based on the surrounding sounds of the speech input data in order to determine a relative lack of vibrations (e.g., very low vibrations to the surrounding sounds or complete lack of vibrations to the surrounding sounds).

The term "language attribute" may refer to data, text, identifiers, metadata, or other related speech or sound related characteristics associated with language(s) or features that are extracted from training datasets and used to create a speech recognition resampling training corpus. In some embodiments, the language attributes are extracted from training datasets comprising previously captured speech input (e.g., historical speech input data) by, in some embodiments, a speech recognition resampling service (e.g., speech recognition resampling service 221). In some embodiments, the language attribute(s) may comprise language identifier (s), the language identifier referring to one or more items of data by which a language in sound may be identified within the speech recognition system. For example, the language identifier may comprise text string(s), numerical character (s), alphabetical character(s), alphanumeric code(s), ASCII character(s), a pointer, a sample of sound, other unique identifier, or a combination thereof. By way of non-limiting example, the language attribute (e.g., by way of a language identifier) may identify a language associated with specific words associated historical speech input data (e.g., based on a vocabulary dictionary comprising specific words associated with specific languages).

In some embodiments, and by way of non-limiting example, a different speech recognition model may be trained for each specific language within the speech recognition system. For example, the speech recognition system may request input by the user via an input/output circuitry such as a graphical user interface configured on an input/output circuitry of the speech recognition device (e.g., input/output circuitry 303) to indicate a specific user language. In some embodiments, and once the language has been selected by the user, the speech recognition system (e.g., speech recognition device 310) may select a speech recognition resampling model trained on the language selected by the user by accessing the library of speech recognition models 220. In some embodiments, a speech recognition resampling service 221 may be used to extract training datasets for the speech recognition resampling models from a database comprising speech input provided by a plurality of users (e.g., historical speech input data). In some embodiments, a speech recognition model may be language-agnostic and may be used to process a plurality of speech inputs from a plurality of users/speakers of a variety of different languages. Thus, a single speech recognition model may be used and trained for a plurality of languages.

In some embodiments, the speech recognition model used to determine the optimized digital signal may be speaker dependent and may comprise a speech recognition resampling training corpus using speech recognition attributes comprising at least one of a pitch attribute(s), volume attribute(s), pause attribute(s), frequency attribute(s), language attribute(s), and/or user identifier attribute(s), and/or the like.

The term "user identifier attribute" may refer to data, text, identifiers, metadata, or other related speech or sound related characteristics associated with user identifier(s) or features that are extracted from training datasets and used to create a speech recognition resampling training corpus. In some embodiments, the user identifier attributes are extracted from training datasets comprising previously captured speech input (e.g., historical speech input data) by, in some embodiments, a speech recognition resampling service (e.g., speech recognition resampling service 221). In some embodiments, the user identifier attribute(s) may comprise user identifier(s), the user identifier referring to one or more items of data by which a user may be identified in the speech recognition system. For example, the user identifier may comprise text string(s), numerical character(s), alphabetical character(s), alphanumeric code(s), ASCII character(s), a pointer, a sample of sound, other unique identifier, or a combination thereof. By way of non-limiting example, the user identifier attribute (e.g., by way of a user identifier) may identify a user and their associated historical speech input data. In some embodiments, the user identifier and historical speech input data associated with the user identifier may be used to generate a user profile comprising the historical speech input data of the specific user and associated attributes.

In some embodiments, the speech recognition model used to determine the optimized digital signal may be gender dependent and may comprise a speech recognition resampling training corpus using speech recognition attributes comprising at least one of a pitch attribute(s), volume attribute(s), pause attribute(s), frequency attribute(s), language attribute(s), and/or gender attribute(s), and/or the like.

The term "gender attribute" may refer to data, text, identifiers, metadata, or other related speech or sound related characteristics associated with gender of a user which may be extracted from training datasets and used to create a speech recognition resampling training corpus. In some embodiments, the gender attributes are extracted from training datasets comprising previously captured speech input (e.g., historical speech input data) by, in some embodiments, a speech recognition resampling service (e.g., speech recognition resampling service 221). In some embodiments, the gender attribute(s) may comprise gender identifier(s), the gender identifier referring to one or more items of data by which a gender of a user may be identified in the speech recognition system. For example, the gender identifier may comprise text string(s), numerical character(s), alphabetical character(s), alphanumeric code(s), ASCII character(s), a pointer, a sample of sound, other unique identifier, or a combination thereof. By way of non-limiting example, the gender attribute (e.g., by way of a gender identifier) may identify a gender of a user and an associated historical speech input data, and map the historical speech input data of the gender to other historical speech input data of the same gender from other users. For example, a previously captured speech input data (e.g., historical speech input data) associated with a binary, male gender may comprise speech input data of a deeper and/or lower tone than previously captured speech input data associated with a female gender, which may comprise speech input data of a higher tone.

As shown at operation 530 the apparatus (e.g., the speech recognition server 310) includes means, such as processor 302, input/output circuitry 303, communications circuitry 304, speech recognition circuitry 305, and/or the like, for training the speech recognition resampling model using the speech recognition resampling training corpus. In some embodiments, the resampling training corpus may comprise at least one type of pitch attribute(s), volume attribute(s), pause attribute(s), frequency attribute(s), language attribute (s), user identifier attribute(s), and/or gender attribute(s). The speech recognition resampling model may process the attributes of the speech recognition resampling training corpus, which may comprise data extracted and received from a plurality of users to collect each of the associated attributes, in order to determine patterns of attributes in order to determine a predetermined range for an optimized speech rate for digital data. In some embodiments, the predetermined range for the digital data may comprise a range that the digital data must be limited to in order for the digital data to be matched to an optimized speech rate. For instance, and as described in detail above, the predetermined range may be determined by analyzing historical speech input data against output hypotheses and/or hint data objects, or based on real-time received speech input.

In some embodiments, the predetermined range may be determined by analyzing the attribute(s) (e.g., the frequency attributes, and/or the like) of the speech recognition resampling training corpus and the associated historical speech input data and determining a range for the historical speech input data wherein the data associated with the attribute(s) is not lost and/or unwanted interference does not occur. The predetermined range for each of the received and/or stored historical speech input data may be averaged in order to return the predetermined range applied in the speech recognition resampling model. By way of non-limiting example, once this predetermined range has been determined, the speech recognition resampling model may use the predetermined range to generate the optimized speech rate based on the input of digital data (e.g., apply the predetermined range to the input of digital data received by either a user in real-time or by a speech input repository/data storage device).

In some embodiments, the digital data received by the speech recognition system (e.g., from the real-time received speech input and/or the historical speech input data) may be applied to the predetermined range by the speech recognition resampling model in order to determine if there are any outliers of the digital data outside the predetermined range. By way of non-limiting example, if digital data is assessed to be outside the predetermined range, the speech recognition resampling model may determine how far outside of the range the digital data is and then speed up or slow down the digital data in order to bring the digital data previously outside the predetermined range inside the predetermined range. For example, if a portion of the digital data is comprised outside of the predetermined range, then the speech recognition resampling model may speed up the digital data so that the range of digital data takes up less space within a time period associated with the predetermined range and all the portions of the digital data may be comprised within the predetermined range. In some embodiments, if all the digital data is originally comprised within the predetermined range, then the digital data may not be modified at all.

Figure 6:
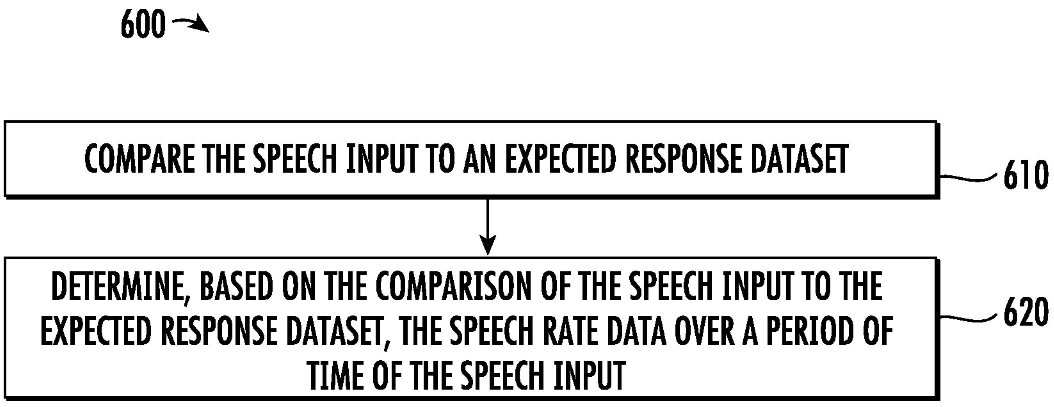
FIG. 6 provides an example flowchart illustrating various processes and/or procedures for determining a speech rate data, in accordance with various example embodiments of the present disclosure.

FIG. 6 provides an example flowchart 600 illustrating various processes, operations, and/or procedures for determining a speech rate data over a period of time of the speech input, in accordance with various example embodiments. The operations illustrated in FIG. 6 may, for example, be performed by, with the assistance of, and/or under the control of one or more apparatuses, such as the speech recognition server 310, as described above. In this regard, performance of the operations may invoke one or more of memory 301, processor 302, input/output circuitry 303, communications circuitry 304, and/or speech recognition circuitry 305. Certain operations may be considered optional, as indicated by dashed lines.

As shown at operation 610 the apparatus (e.g., the speech recognition server 310) includes means, such as processor 302, input/output circuitry 303, communications circuitry 304, speech recognition circuitry 305, and/or the like, for comparing the speech input to a hint data object. By way of a non-limiting example, a user of the speech recognition system may be prompted by the speech recognition system with a question or statement and wait for the user of the speech recognition system to respond to the prompt. In some embodiments, the prompts may be associated with a hint data object which the speech recognition system may use to identify a speech rate data. For example, if the prompt by the speech recognition system comprises a statement or question regarding the inventory of a specific item, the hint data object by the user may comprise an amount of the inventory such as a number or a number accompanied by an identifier of the item of inventory (e.g., "fifteen" and/or "fifteen of item x"). Therefore, and based on this example, the speech rate data may be a one word per second (e.g., when the hint data object is "fifteen"), or the speech rate data may be two words per second if "fifteen of item x" is spoken over a two-second period.

In some embodiments, the speech recognition system may be configured to analyze a user identifier associated with the user of the speech recognition system (e.g., by a user inputting their user identifier/user ID into the speech recognition system before a speech recognition session) and retrieve a workflow associated with the user identifier from a workflow database (e.g., memory 301). The workflow associated with the user may include a plurality of tasks for the user that the user should complete at specified times of their shift (e.g., their shift of work during the speech recognition session). In some embodiments, the speech recognition system may use the identified workflow and plurality of tasks to determine a hint data object of the user at specified times of the workflow/shift. For example, a user tasked with being in a certain location of the warehouse to move inventory may generate a hint data object by the speech recognition system such as the phrase, "moved inventory of item x to location B." Therefore, and based on this example, the speech rate data may be one word per second (e.g., when the expected response is "moved inventory of item x to location B" is spoken over a period of eight seconds), or the speech rate data may be two words per second if "moved inventory of item x to location B" is spoken over a four-second period.

In some embodiments, the speech recognition system may be configured to prompt the user to indicate a check-digit associated with a location and/or a task. By way of non-limiting example, the speech recognition system may prompt a user to speak a specified digit into the speech recognition system (e.g., headset 16) when the user is in a specific location associated with the prompt and/or when the user has completed a task associated with the prompt. For example, the speech recognition system may prompt the user by prompting the user to "say one if [the user] is in a specific location" and/or "say three if [the user] has completed inventorying item x." Additionally and/or alternatively, the speech recognition system may prompt the user to give updates during a workflow based on check-digits by requesting the user (e.g., by a prompt) to say a specific number and/or letter digit when the user is doing a certain task of the workflow (e.g., "say four if [the user] is currently inventorying item x" in order to track where in the workflow the user is at during a specific time.

As shown at operation 620 the apparatus (e.g., the speech recognition server 310) includes means, such as processor 302, input/output circuitry 303, communications circuitry 304, speech recognition circuitry 305, and/or the like, for determining, based on the comparison of the speech input to the hint data object, the speech rate data over a period of time of the speech input comparing the speech input to a hint data object. In some embodiments, and based on the hint data object, the speech recognition system may compare the hint data object—for example, a specific statement such as "fifteen"/"fifteen of item x"—which may have a speech rate data of one word per second rate and/or two words per second rate, to the received speech input which may include the item number (e.g., "fourteen," "fifteen," "sixteen") and/or an identifier of the item and inventory number (e.g., "fourteen of item x") to determine that the speech rate data of the hint data object and the speech rate data of the digital data over the period of time of the speech input match.

FIG. 7 provides an example flowchart 700 illustrating various processes, operations, and/or procedures for determining an output hypothesis of the speech recognition system, in accordance with various example embodiments. The operations illustrated in FIG. 7 may, for example, be performed by, with the assistance of, and/or under the control of one or more apparatuses, such as the speech recognition server 310, as described above. In this regard, performance of the operations may invoke one or more of memory 301, processor 302, input/output circuitry 303, communications circuitry 304, and/or speech recognition circuitry 305. Certain operations may be considered optional, as indicated by dashed lines.

As shown at operation 710 the apparatus (e.g., the speech recognition server 310) includes means, such as processor 302, input/output circuitry 303, communications circuitry 304, speech recognition circuitry 305, and/or the like, for accessing a speech input from a user and a hint data object. In some embodiments, the speech recognition system may access the speech input from a user, further comprising non-optimized digital data and/or optimized digital data (e.g., an optimized digital signal like that generated at operation 440). In some embodiments, the speech input from the user accessed by the speech recognition system may be associated with a hint data object accessed by the speech recognition system at a similar time or at the same time as the speech input from the user. Such a hint data object may refer to a data entity that describes content data (e.g., text data, image data, location data, or the like) associated with the speech input of the user, the user identifier, and/or user ID. By way of non-limiting example, the hint data object may comprise text data, image data, location data, or the like which may identify the location of the user at the time of the speech input, a task in a workflow associated with the user at the time of the speech input, a current or previous check-digit prompted to the user and/or provided by the user, and/or previous speech input provided by the user associated with the user identifier/user ID.

As shown at operation 720 the apparatus (e.g., the speech recognition server 310) includes means, such as processor 302, input/output circuitry 303, communications circuitry 304, speech recognition circuitry 305, and/or the like, for processing the speech input to generate a plurality of hypotheses of the speech input, wherein each hypothesis of the plurality of hypotheses comprises a sequence of hypothesis words. In some embodiments, the speech input from the user may be processed by the speech recognition system (e.g., by the feature generator 209) to generate a plurality of hypotheses of the speech input. By way of non-limiting example, the speech recognition system may split or divide the speech input (e.g., the optimized digital signal and/or non-optimized digital signal) into a sequence of time-slices, or frames, for processing by a feature generator 209 to produce features. In some embodiments, a feature may be a vector, matrix, or otherwise organized set of numbers representing the acoustic features of the frames. The digitized speech input or any data derived from it that describe the acoustic properties of the speech input, such as the features, are known as acoustic data. These features may, in some embodiments, be the result of Linear Predictive Coding (LPC), but other methods are contemplated within the scope of the embodiments described herein as well.

In some embodiments, a speech recognition search algorithm function 211 analyzes the features 210 in an attempt to determine what hypothesis to assign to the speech input captured by speech recognition system. In a possible embodiment, the recognition search relies on probabilistic models retrieved from a library of speech recognition models 216. Each of the models in the library 216 may be customized to a user or may be generic to a set of users.

The speech recognition search algorithm 211 (e.g., a modified Viterbi algorithm) assesses the features 210 generated in the feature generator 209 using reference representations of speech, or speech models (e.g., hidden Markov models, DTW templates, or neural networks), in library of speech recognition models 216 in order to determine the word (or words) that best match the speech input from the user. Part of this recognition process is to assign one or more confidence scores that quantitatively indicate how confident the recognizer is that its hypothesis 212 is correct. In some embodiments, the generated plurality of hypotheses may comprise the associated confidence score for each of the hypotheses and may transmit the plurality of hypotheses and confidence scores to a hint-based acceptance algorithm 213 to determine the correct hypothesis. As such, and in some embodiments, a hypothesis consisting of one or more vocabulary items (i.e., words) and associated confidence scores, is transmitted to the hint-based acceptance algorithm 213.

As shown at operation 730 the apparatus (e.g., the speech recognition server 310) includes means, such as processor 302, input/output circuitry 303, communications circuitry 304, speech recognition circuitry 305, and/or the like, for assigning each hypothesis a confidence score.

In some embodiments, a confidence score may be assigned to one hypothesized word (i.e., hypothesis word) or one confidence score can be associated with multiple hypothesized words (e.g., a confidence score for an aggregated set of hypothesis words). Based on the confidence scores assigned to each hypothesis and/or hypothesized word, each hypothesis may be ranked from highest confidence score to lowest confidence score.

In some embodiments, if the confidence score is above a predetermined acceptance threshold (or an adjusted threshold when the hypothesis matches the hint data object), then the hypothesis associated with the confidence score meeting the predetermined acceptance threshold may be transmitted to the hint-based acceptance algorithm 213 for further processing. If, however, the confidence score is not above the acceptance threshold, then the hint-based acceptance algorithm 213 makes a decision to ignore or reject the hypothesis associated with the confidence score.

As shown at operation 740 the apparatus (e.g., the speech recognition server 310) includes means, such as processor 302, input/output circuitry 303, communications circuitry 304, speech recognition circuitry 305, and/or the like, for comparing the hint data object to each hypothesis of the plurality of hypotheses to determine an output hypothesis. By way of a non-limiting example, a comparison of the hint data object to each hypothesis of the plurality of hypotheses may comprise an exact matching or a matching to a certain threshold in order to determine the output hypothesis. For example, the hint data object may comprise text, metadata, and/or identifiers of data identified by the speech recognition system at the time the speech input is accessed and/or around the time the speech input is accessed (e.g., immediately before and/or immediately thereafter). The hint data object may, therefore, be matched to each hypothesis which may comprise text data and/or metadata of a location (e.g., a specific location stated by the user in the speech input and/or a specific location determined by a check-digit may be matched to the hint-data object comprising the same location identifier); text data and/or metadata of a user identifier/user ID (e.g., the hint data object may comprise a task identifier associated with a workflow of a user identifier/user ID and may be matched to a hypothesis comprising the same task identifier); check-digit data (e.g., check-digit data provided by the user, based on prompting by the speech recognition system, may comprise text and/or metadata and may be matched to data of the hypotheses such as text data associated with a location, task, and/or the like); and/or GPS location data (e.g., the hint data object may comprise GPS location data and match any hypotheses comprising the same location data based on text data and/or metadata of the hypothesis).

In some embodiments, the comparison of the hint data object may comprise a threshold score to determine whether a hypothesis comprising a specified portion of correct words indicating a match to hint data object(s) may be determined as the output hypothesis. By way of non-limiting example, if a hypothesis comprises a plurality of words such as "[the user] has finished inventory at location y" and the hint data object comprises hint data object of "location y," the speech recognition system may determine the hypothesis is the output hypothesis based on the matching of at least one word in the hypothesis to the hint data object. In contrast, and by way of a non-limiting example, the speech recognition system may also set a predetermined hint data object acceptance threshold to require half the words to match the hint data object in order to determine a hypothesis is the output hypothesis based on the hint data object. For example, the statement, "[the user] has finished inventory at location y" may not be used as the output hypothesis in the above example, but the statement "I'm at location y" spoken by the user may be used as the output hypothesis.

As shown at operations 750 and 760 the apparatus (e.g., the speech recognition server 310) includes means, such as processor 302, input/output circuitry 303, communications circuitry 304, speech recognition circuitry 305, and/or the like, for determining the output hypothesis based on whether the hint data object matches the hypothesis of the plurality of hypotheses. By way of non-limiting example and as disclosed above, the matching between each hypothesis of the plurality of hypotheses and the hint data object may comprise an exact matching and/or a matching to a certain threshold. If a hypothesis of the plurality of hypotheses provided to the hint-based acceptance algorithm 213 exactly matches and/or matches a certain threshold (e.g., a predetermined hint data object acceptance threshold), then the output hypothesis may comprise the determined hypothesis. If, however, and as shown at operation 760, none of the hypotheses of the plurality of hypotheses matches and/or meets the predetermined hint data object acceptance threshold, then the output hypothesis may comprise the hypothesis comprising the highest confidence score of each of the plurality of hypotheses.

In some embodiments, if the output hypothesis comprises a hypothesis that does not match the hint data object, then the system may then prompt the user to repeat the speech. In this instance, the user may repeat the speech to input device (e.g., the headset 16).

Figure 8:
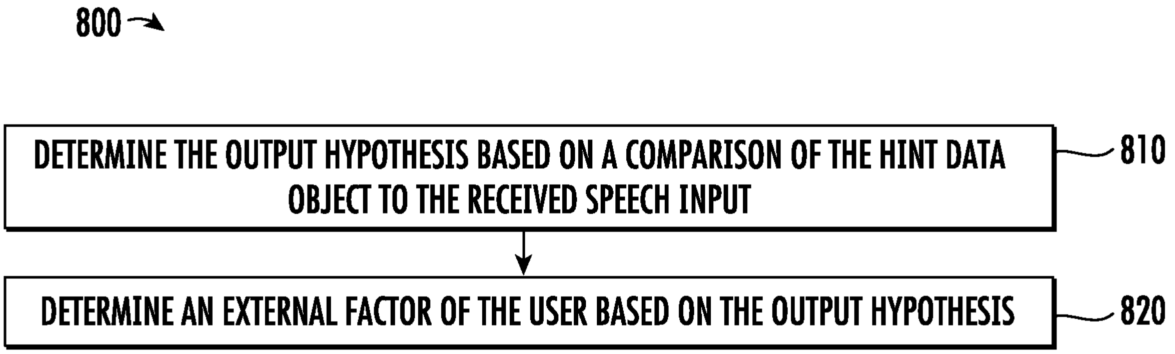
FIG. 8 provides an example flowchart illustrating various processes and/or procedures for determining an external factor of the user based on the output hypothesis of the speech recognition system, in accordance with various example embodiments of the present disclosure.

FIG. 8 provides an example flowchart 800 illustrating various processes, operations, and/or procedures for determining an external factor of the user based on a received hint data object, in accordance with various example embodiments. The operations illustrated in FIG. 8 may, for example, be performed by, with the assistance of, and/or under the control of one or more apparatuses, such as the speech recognition server 310, as described above. In this regard, performance of the operations may invoke one or more of memory 301, processor 302, input/output circuitry 303, communications circuitry 304, and/or speech recognition circuitry 305. Certain operations may be considered optional, as indicated by dashed lines.

As shown at operation 810 the apparatus (e.g., the speech recognition server 310) includes means, such as processor 302, input/output circuitry 303, communications circuitry 304, speech recognition circuitry 305, and/or the like, for determining the output hypothesis based on a comparison of the hint data object to the received speech input. By way of a non-limiting example, the received speech input may comprise speech that matches the hint data object, such as a speech input comprising a check-digit may match (e.g., an exact matching or a threshold matching) a hint data object comprising a similar or same check-digit. In some embodiments, the received speech input that matches the hint data object may be received from a user based on a prompt provided by the speech recognition system such as a request by the speech recognition system to confirm the user's location, the user's current task, an amount of inventory, the user's previous tasks, the user's ID number, and/or the like. The received speech input comprising a match to the hint data object may be provided by the user as a speech input by way of a spoken number (e.g., prompted to say "one" if true, prompted to say "zero" if false; prompted to say "two" if at location A; prompted to say "three" if at location B; prompted to say "three" if at location C; prompted to say specific words comprising alphabet letters such as "c," "y," or "n"; a combination of letters such as "confirm, "yes," or "no"; a plurality of spoken numbers to indicate a string of numbers and/or letters; and/or the like). In some embodiments, the speech input provided by the user may be used by the speech recognition system to determine the output hypothesis based on the hint data object, like that described in detail for FIG. 7.

As shown at operation 820 the apparatus (e.g., the speech recognition server 310) includes means, such as processor 302, input/output circuitry 303, communications circuitry 304, speech recognition circuitry 305, and/or the like, for determining an external factor of the user based on the output hypothesis. By way of non-limiting example, once a user's output hypothesis has been determined along with a validation of the received speech input to the hint data object, an external factor of the user may be determined such as the location of the user, completed tasks within the user's workflow, a current task within the user's workflow, yet-to-be-completed tasks within the user's workflow, and/or the like. By way of non-limiting example, the speech recognition system may know the hint data object (e.g., the expected check-digit response from the user) based on knowledge of the bin or slot to which the system prompted the user to go. Indeed, and by way of a non-limiting example, a user may be directed to a particular bin or slot and asked to speak the hint data object (e.g., check-digit(s)) assigned to that bin or slot to verify his location in a warehouse and the user may indicate his location by speaking "one" to verify his location at the bin or slot and, additionally, the speaker may input a speech input comprising data regarding the location of the user, such as speech input regarding a user's current work flow or current task in a workflow to the apparatus. For example, a speaker associated with the apparatus may provide a speech input comprising inventory data within the determined location (e.g., "Inventory of item x is 10 units," "finish inventorying item x," "inventorying item x will start in 5 minutes," and/or the like), and wherein based additionally on the received and verified hint data object by the user, the system may determine the correct location of the user. The system described herein makes a comparison of the output hypothesis to the hint data object to determine that the user is at the proper location and/or in the proper section or step of the user's assigned workflow.

It is to be understood the implementations are not limited to particular systems or processes described which may, of course, vary. It is also to be understood that the terminology used herein is for the purpose of describing particular implementations only and is not intended to be limiting. As used in this specification, the singular forms "a", "an" and "the" include plural referents unless the content clearly indicates otherwise. Thus, for example, references to "an image" includes a combination of two or more images and references to "a graphic" includes different types and/or combinations of graphics.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for generating an optimized digital signal in a speech recognition system, the method comprising:

receiving a speech input from a user, the speech input comprising an electrical signal;

converting the electrical signal to digital data, wherein the digital data comprises of a specified speech rate data;

estimating a speech rate data of a previously captured speech input based on historical speech input data matching at least one of a plurality of hint data objects;

determining a first predetermined range associated with the specified speech rate data based on at least first error rate in the digital data;

determining a second predetermined range associated with the speech rate data based on at least second error rate in the historical speech input data;

processing the digital data by a speech recognition speech rate model trained to determine an optimized speech rate of the digital data, wherein the optimized speech rate of the digital data is based at least on the specified speech rate data, the first predetermined range and the second predetermined range;

applying the optimized speech rate to the digital data to generate the optimized digital signal; and processing the optimized digital signal by a speech recognition decoder.

2. The method of claim 1, further comprising:

collecting training datasets from one or more speech recognition model development tools;

extracting speech recognition attributes from the training datasets to create a speech recognition speech rate training corpus, wherein the speech recognition attributes comprise a frequency attribute; and training the speech recognition speech rate model using the speech recognition speech rate training corpus.

3. The method of claim 1, wherein the second predetermined range is determined by a range of speech recognition attributes, wherein the range of speech recognition attributes comprises data from a plurality of users, wherein the second predetermined range is generated based on normalization of the optimized speech rate for each of a speech recognition attribute of the range of speech recognition attributes.

4. The method of claim 1, further comprising:

comparing the speech input to a hint data object of the plurality of hint data objects; and determining, based on the matching of the speech input to the hint data object of the plurality of hint data objects, the speech rate data over a period of time of the speech input.

5. The method of claim 1, wherein the speech recognition speech rate model is trained for each language identified in the speech recognition system.

6. The method of claim 1, wherein the speech input of the user is segmented from a plurality of speech inputs by the user, the segmentation of the speech input being based on at least one of a plurality of predetermined cutoff instances.

7. An apparatus configured for generating an optimized digital signal in a speech recognition system, the apparatus comprising at least one processor and at least one memory, the at least one memory having computer-coded instructions therein, wherein the computer-coded instructions are configured to, in execution with the at least one processor, cause the apparatus to:

receive a speech input from a user, the speech input comprising an electrical signal; convert the electrical signal to digital data, wherein the digital data comprises of a specified speech rate data;

estimating a speech rate data of a previously captured speech input based on historical speech input data matching at least one of a plurality of hint data objects;

determine a first predetermined range associated with the specified speech rate data based on at least first error rate in the digital data;

determine a second predetermined range associated with the speech rate data based on at least second error rate in the historical speech input data;

process the digital data by a speech recognition speech rate model trained to determine an optimized speech rate of the digital data, wherein the optimized speech rate of the digital data is based at least on the specified speech rate data, the first predetermined range and the second predetermined range;

apply the optimized speech rate to the digital data to generate the optimized digital signal; and process the optimized digital signal by a speech recognition decoder.

8. The apparatus of claim 7, the computer-coded instructions are further configured to cause the apparatus to:

collect training datasets from one or more speech recognition model development tools;

extract speech recognition attributes from the training datasets to create a speech recognition speech rate training corpus, wherein the speech recognition attributes comprise a frequency attribute; and train the speech recognition speech rate model using the speech recognition speech rate training corpus.

9. The apparatus of claim 8, wherein the second predetermined range is determined by a range of speech recognition attributes, wherein the range of speech recognition attributes comprises data from a plurality of users, wherein the second predetermined range is generated based on normalization of the optimized speech rate for each of a speech recognition attribute of the range of speech recognition attributes.

10. The apparatus of claim 7, the computer-coded instructions are further configured to cause the apparatus to:

compare the speech input to a hint data object of the plurality of hint data objects; and determine, based on the matching of the speech input to the hint data object of the plurality of hint data objects, the speech rate data over a period of time of the speech input.

11. The apparatus of claim 7, wherein the speech recognition speech rate model is trained for each language identified in the speech recognition system.

12. The apparatus of claim 7, wherein the speech input of the user is segmented from a plurality of speech inputs by the user, the segmentation of the speech input being based on at least one of a plurality of predetermined cutoff instances.

13. The apparatus of claim 7, the computer-coded instructions are further configured to cause the apparatus to:

access the speech input from the user and at least one of the plurality of hint data objects;

process the speech input to generate a plurality of hypotheses related to the speech input, wherein each hypothesis of the plurality of hypotheses comprises a sequence of hypothesis words;

assign each hypothesis of the plurality of hypotheses a confidence score; and compare at least one of the plurality of hint data objects to each hypothesis of the plurality of hypotheses to determine an output hypothesis.

14. The apparatus of claim 13, wherein the confidence score assigned to each hypothesis of the plurality of hypotheses comprises a confidence score for each of the hypothesis words, and wherein the confidence score assigned to each hypothesis of the plurality of hypotheses comprises an aggregation of the confidence score for each of the hypothesis words.

15. The apparatus of claim 13, wherein the speech input of the user is segmented from a plurality of speech inputs by the user, the segmentation of the speech input being based on at least one of a plurality of predetermined cutoff instances.

16. The apparatus of claim 13, the computer-coded instructions are further configured to cause the apparatus to:

determine the output hypothesis based on a comparison of at least one of the plurality of hint data objects to the received speech input; and determine an external factor of the user based on the output hypothesis.

17. The apparatus of claim 13, the computer-coded instructions are further configured to cause the apparatus to:

determine, in response to comparing at least one of the plurality of hint data objects to each hypothesis of the plurality of hypotheses, the output hypothesis, wherein:

the output hypothesis comprises a highest confidence score of each hypothesis of the plurality of hypotheses in instance where at least one of the plurality of hint data objects fails to match each of the hypothesis of the plurality of hypotheses, and the output hypothesis comprises each hypothesis of the plurality of hypotheses in the instance where at least one of the plurality of hint data objects matches the hypothesis of the plurality of hypotheses.

18. The apparatus of claim 13, wherein at least one of the plurality of hint data objects comprises user data.

19. A computer implemented method configured for generating an optimized digital signal in a speech recognition system, the computer implemented method comprising:

receiving a speech input from a user, the speech input comprising an electrical signal;

converting the electrical signal to digital data, wherein the digital data comprises of a specified speech rate data;

estimating a speech rate data of a previously captured speech input based on historical speech input data matching at least one of a plurality of hint data objects;

determining a first predetermined range associated with the specified speech rate data based on at least first error rate in the digital data;

determining a second predetermine range associated with the speech rate data based on at least second error rate in the historical speech input data;

processing the digital data by a speech recognition speech rate model trained to determine an optimized speech rate of the digital data, wherein the optimized speech rate of the digital data is based at least on the specified speech rate data, the determined first predetermined range and the second predetermined range;

applying the optimized speech rate to the digital data to generate the optimized digital signal; and processing the optimized digital signal by a speech recognition decoder.

20. The computer implemented method of claim 19, further comprising:

collecting training datasets from one or more speech recognition model development tools;

extracting speech recognition attributes from the training datasets to create a speech recognition speech rate training corpus, wherein the speech recognition attributes comprise a frequency attribute; and training the speech recognition speech rate model using the speech recognition speech rate training corpus.

* * * * *